US012639102B2

(12) United States Patent
Choi et al.

(10) Patent No.: US 12,639,102 B2
(45) Date of Patent: May 26, 2026

(54) ELECTRONIC DEVICE AND METHOD FOR REDUCED POWER CONSUMPTION

(71) Applicant: Samsung Electronics Co., Ltd., Suwon-si (KR)

(72) Inventors: Hojung Choi, Suwon-si (KR); Sangjun Park, Suwon-si (KR); Hyeonsu Lee, Suwon-si (KR); Jongwoo Kim, Seongnam-si (KR); Gilyoung Noh, Suwon-si (KR); Bohyung Lee, Suwon-si (KR); Junguk Lee, Suwon-si (KR); Jongkyu Lee, Seoul (KR); Jaekyong Choi, Suwon-si (KR); Inhwan Hwang, Hwaseong-si (KR); Mooyoung Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 117 days.

(21) Appl. No.: 17/412,595

(22) Filed: Aug. 26, 2021

(65) Prior Publication Data

US 2021/0389973 A1     Dec. 16, 2021

Related U.S. Application Data

(63) Continuation of application No. 15/642,257, filed on Jul. 5, 2017, now Pat. No. 11,138,032.

(30) Foreign Application Priority Data

Jul. 29, 2016     (KR) ........................ 10-2016-0097554

(51) Int. Cl.
*G06F 9/48* (2006.01)
*G06F 9/54* (2006.01)
*H04W 52/02* (2009.01)

(52) U.S. Cl.
CPC ................ *G06F 9/48* (2013.01); *G06F 9/485* (2013.01); *G06F 9/543* (2013.01); *H04W 52/0264* (2013.01); *Y02D 30/70* (2020.08)

(58) Field of Classification Search
CPC ............ G06F 9/48; G06F 9/485; G06F 9/543; H04W 52/0264; Y02D 30/70
See application file for complete search history.

(56) References Cited

U.S. PATENT DOCUMENTS 9,690,685 B2 * 6/2017 Vyas ................... G06F 11/3024
10,122,591 B1 * 11/2018 Pack ..................... H04L 63/101
(Continued)

FOREIGN PATENT DOCUMENTS

CN          103218033 A   *   7/2013
CN          104156053 A   *   11/2014
(Continued)

OTHER PUBLICATIONS

Korean Patent Publication KR 2015-0066083 A; Publication Date: Jun. 16, 2015; 32 pages (Year: 2015).*
(Continued)

*Primary Examiner* — Kevin L Young
*Assistant Examiner* — Kimberly L Jordan

(57) ABSTRACT

A method and an apparatus for reducing power consumption of an electronic device are provided. The method includes executing an app in response to a first user input and switching the app to a background in response to a second user input. The method also includes confirming whether the app that has been switched to the background satisfies at least one condition and automatically limiting an operation of the app when the app that has been switched to the background satisfies the at least one condition. A result of the automatically limiting operation the operation of the app is displayed.

11 Claims, 24 Drawing Sheets

(56) References Cited

U.S. PATENT DOCUMENTS

| | | | | | |
|---|---|---|---|---|---|
| 2003/0126184 A1 | 7/2003 | Austin | | | |
| 2009/0164152 A1 | 6/2009 | Creus et al. | | | |
| 2011/0314145 A1* | 12/2011 | Raleigh | H04L 41/5054 | | |
| | | | 709/224 | | |
| 2012/0209946 A1 | 8/2012 | McClure et al. | | | |
| 2013/0132854 A1* | 5/2013 | Raleigh | H04M 15/77 | | |
| | | | 715/738 | | |
| 2013/0205366 A1 | 8/2013 | Luna et al. | | | |
| 2013/0244686 A1 | 9/2013 | Saha et al. | | | |
| 2014/0064171 A1 | 3/2014 | Zhou et al. | | | |
| 2014/0075567 A1* | 3/2014 | Raleigh | H04L 12/14 | | |
| | | | 726/26 | | |
| 2014/0090077 A1 | 3/2014 | Jeong et al. | | | |
| 2014/0098671 A1* | 4/2014 | Raleigh | H04M 15/80 | | |
| | | | 370/235 | | |
| 2014/0304706 A1 | 10/2014 | Zhang et al. | | | |
| 2015/0133076 A1 | 5/2015 | Brough | | | |
| 2015/0160976 A1 | 6/2015 | Kim et al. | | | |
| 2015/0220127 A1 | 8/2015 | Kukoyi | | | |
| 2015/0346933 A1 | 12/2015 | Vyas et al. | | | |
| 2015/0347262 A1 | 12/2015 | Vyas et al. | | | |
| 2016/0124495 A1 | 5/2016 | Kim et al. | | | |
| 2016/0132093 A1 | 5/2016 | Maiolani et al. | | | |
| 2016/0147292 A1 | 5/2016 | Sunwoo et al. | | | |
| 2017/0121887 A1 | 5/2017 | Hwang et al. | | | |
| 2017/0192619 A1 | 7/2017 | Yang et al. | | | |
| 2019/0286213 A1 | 9/2019 | Wei et al. | | | |

FOREIGN PATENT DOCUMENTS

| | | | | | |
|---|---|---|---|---|---|
| CN | 104486510 A | 4/2015 | | | |
| CN | 104699218 A | 6/2015 | | | |
| CN | 105159816 A | 12/2015 | | | |
| CN | 105208642 A | 12/2015 | | | |
| CN | 105302279 B | 2/2016 | | | |
| CN | 105335134 A | 2/2016 | | | |
| CN | 105528052 B | 4/2016 | | | |
| CN | 105630129 A | 6/2016 | | | |
| EP | 2807835 A2 | 12/2014 | | | |
| EP | 2977854 A1 | 1/2016 | | | |
| EP | 2985695 B1 | 8/2020 | | | |
| KR | 10-00937010 B1 | 1/2010 | | | |
| KR | 10-2012-0114125 A | 10/2012 | | | |
| KR | 10-2015-0066083 A | 6/2015 | | | |
| WO | 2013112642 A2 | 8/2013 | | | |
| WO | WO-2015070428 A1 * | 5/2015 | | G06F 1/3203 | |
| WO | WO-2017084293 A1 * | 5/2017 | | G06F 9/445 | |
| WO | WO-2017156676 A1 * | 9/2017 | | G06F 11/30 | |

OTHER PUBLICATIONS

Korean Patent Application No. 10-2015-0121887, filed Oct. 30, 2015, entitled Method for Controlling Mobile Terminal (US Family No. US 2017-0048801 A1 dated Feb. 16, 2017).

International Search Report dated Sep. 11, 2017, in connection with International Application No. PCT/KR2017/005910, 3 pages.

Extended European Search Report dated Nov. 23, 2017, in connection with European Application No. EP17177974.7, 6 pages.

European Search Report dated Apr. 18, 2019, in connection with European Patent Application No. 19150999.1, 7 pages.

European Search Report dated Jun. 15, 2021, in connection with European Application No. 20189435.9, 11 pages.

Office Action dated Nov. 11, 2022 in connection with Chinese Patent Application No. 201710456600.2, 15 pages.

Office Action dated Oct. 31, 2022 in connection with Malaysia Patent Application No. PI2019000177, 3 pages.

Office Action dated Sep. 20, 2022 in connection with Vietnamese Patent Application No. 1-2019-00065, 4 pages.

Notification of the Third Office Action dated Sep. 2, 2023, in connection with Chinese Patent Application No. 201710456600.2, 13 pages.

Office Action dated Oct. 30, 2023, in connection with Korean Patent Application No. 10-2016-0097554, 13 pages.

Communication pursuant to Article 94(3) EPC dated Apr. 30, 2024, in connection with European Application No. 20189435.9, 8 pages.

Rejection Decision dated Nov. 30, 2023, in connection with Chinese Patent Application No. 201710456600.2, 11 pages.

* cited by examiner

Figure 1:
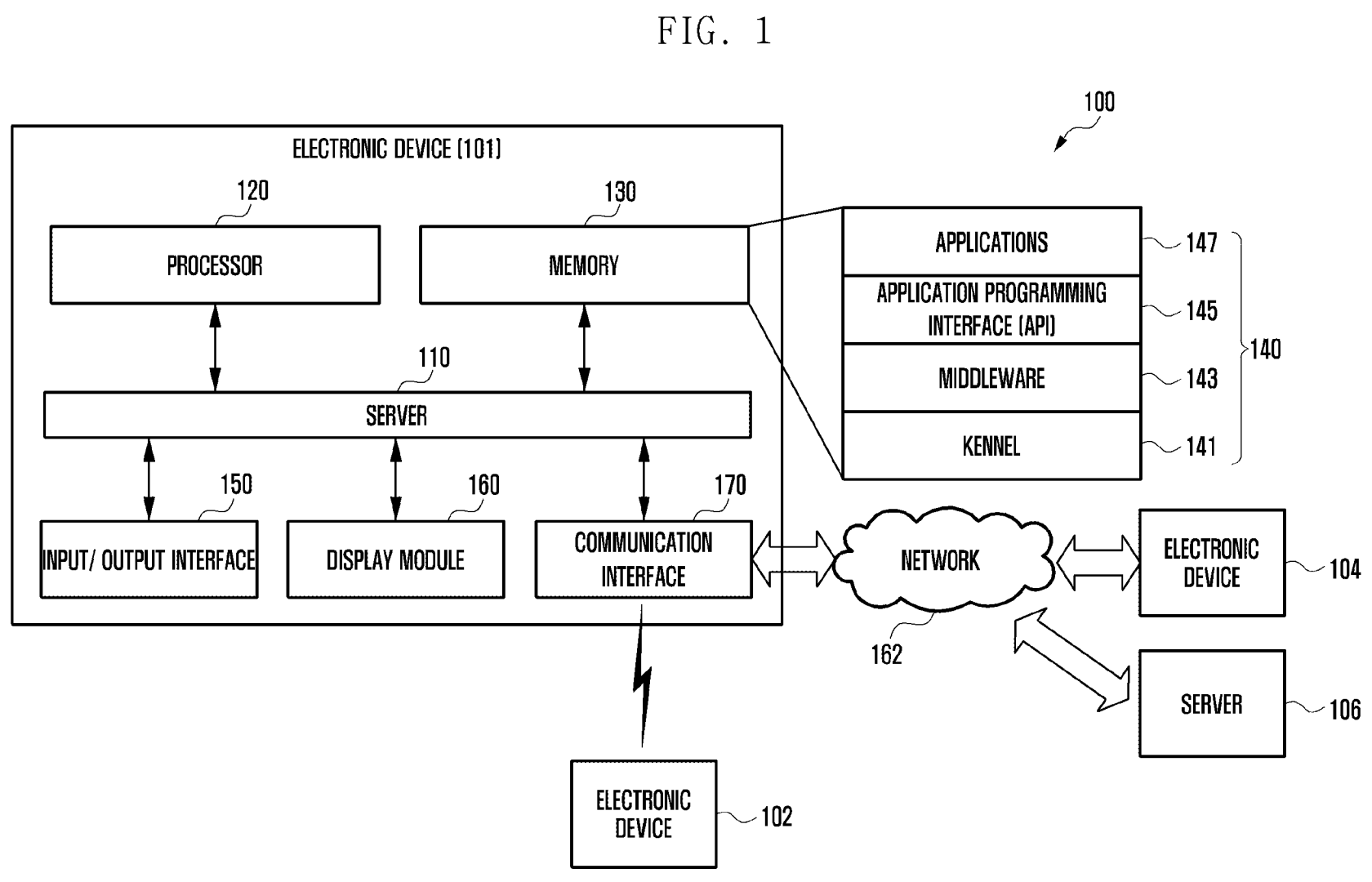

140
147 APPLICATIONS
145 APPLICATION PROGRAMMING INTERFACE (API)
143 MIDDLEWARE
141 KERNEL

104 ELECTRONIC DEVICE

106 SERVER

162 NETWORK

ELECTRONIC DEVICE (101)

130 MEMORY

120 PROCESSOR

110 SERVER

170 COMMUNICATION INTERFACE

160 DISPLAY MODULE

150 INPUT/ OUTPUT INTERFACE

102 ELECTRONIC DEVICE

Figure 3:
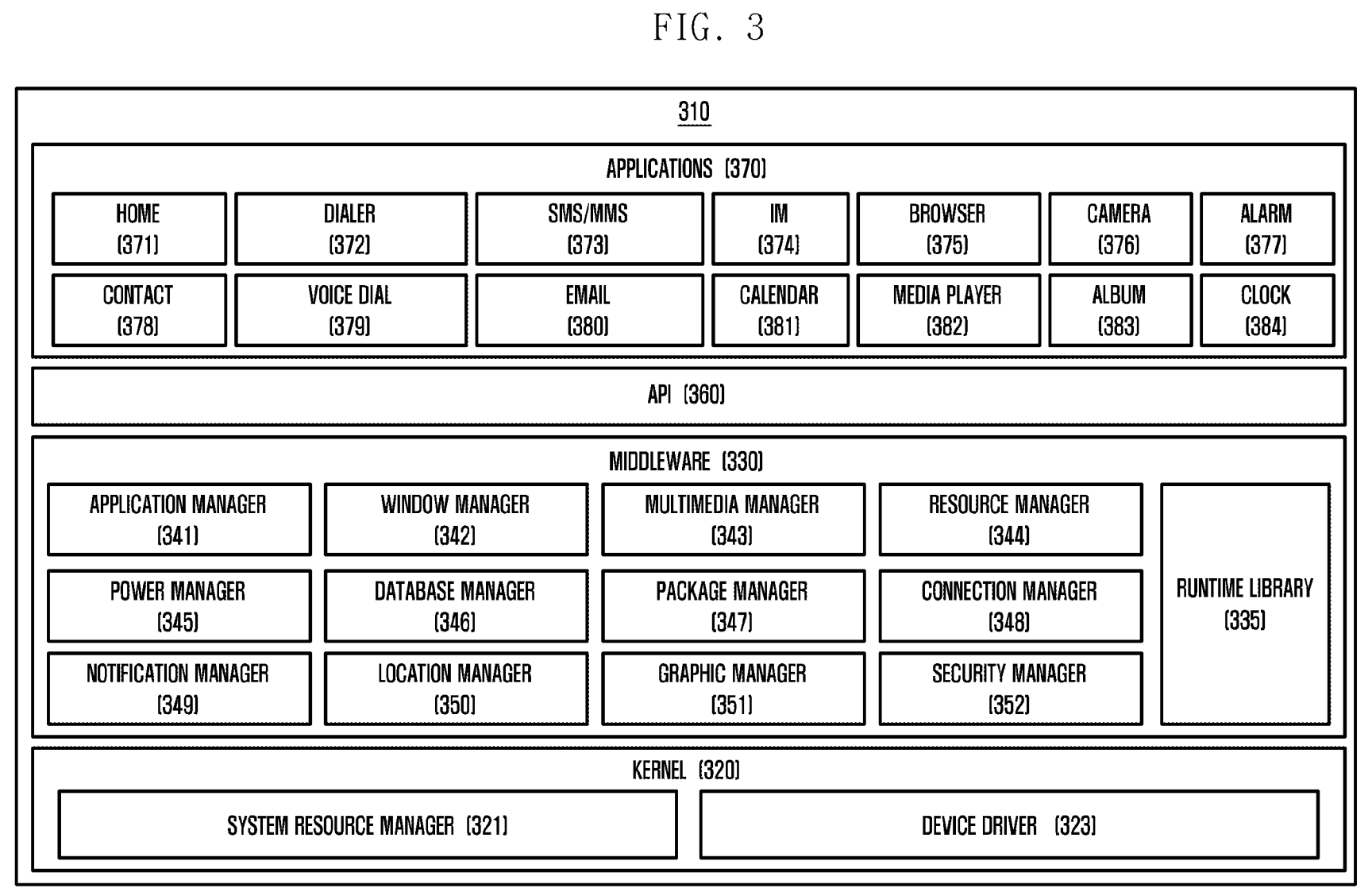

APPLICATIONS [370]

| HOME [371] | DIALER [372] | SMS/MMS [373] | IM [374] | BROWSER [375] | CAMERA [376] | ALARM [377] |
| CONTACT [378] | VOICE DIAL [379] | EMAIL [380] | CALENDAR [381] | MEDIA PLAYER [382] | ALBUM [383] | CLOCK [384] |

API [360]

MIDDLEWARE [330]

| APPLICATION MANAGER [341] | WINDOW MANAGER [342] | MULTIMEDIA MANAGER [343] | RESOURCE MANAGER [344] | RUNTIME LIBRARY [335] |
| POWER MANAGER [345] | DATABASE MANAGER [346] | PACKAGE MANAGER [347] | CONNECTION MANAGER [348] | |
| NOTIFICATION MANAGER [349] | LOCATION MANAGER [350] | GRAPHIC MANAGER [351] | SECURITY MANAGER [352] | |

KERNEL [320]

| SYSTEM RESOURCE MANAGER [321] | DEVICE DRIVER [323] |

FIG. 5

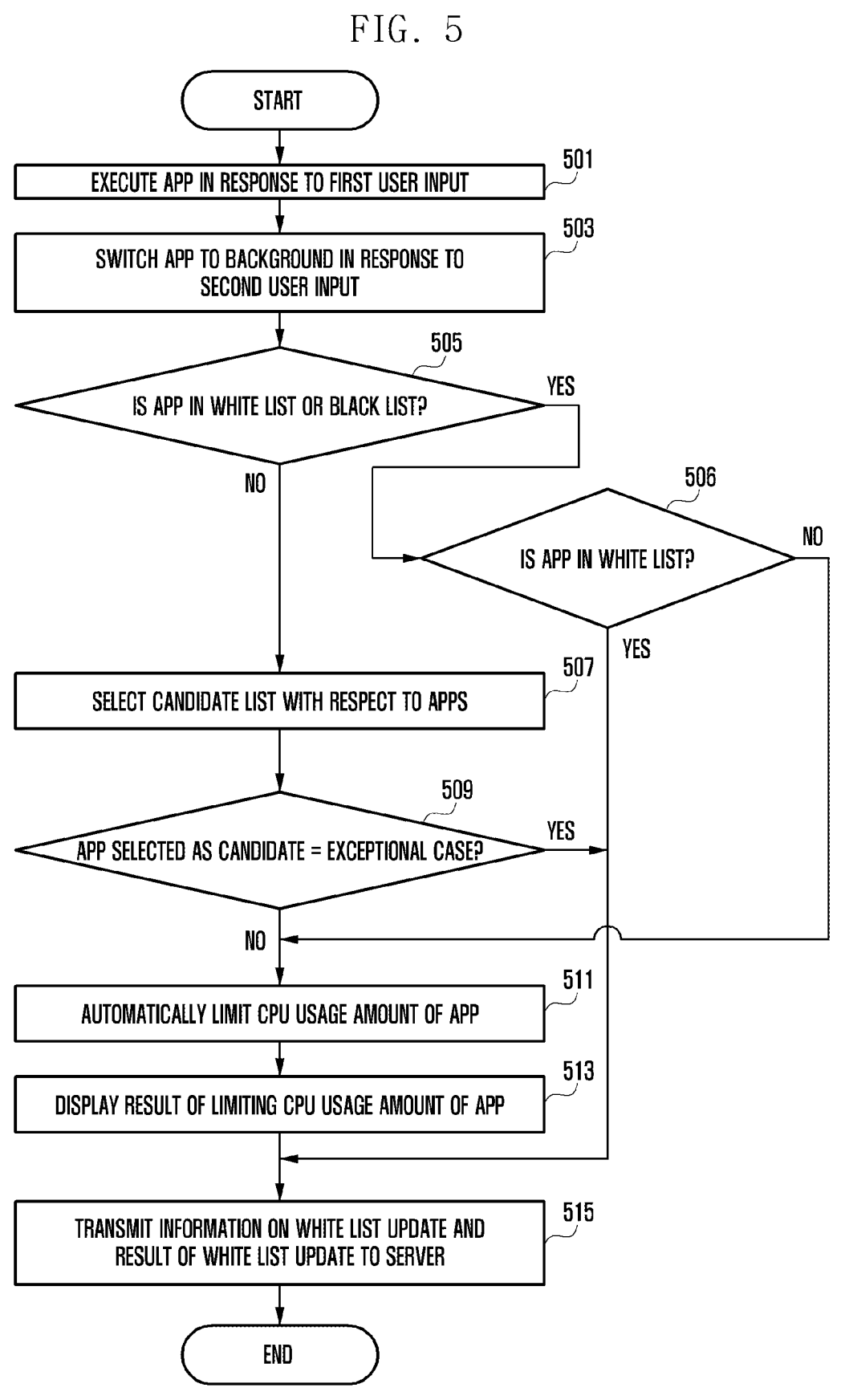

START

501 EXECUTE APP IN RESPONSE TO FIRST USER INPUT

503 SWITCH APP TO BACKGROUND IN RESPONSE TO SECOND USER INPUT

505 IS APP IN WHITE LIST OR BLACK LIST?
YES
NO

506 IS APP IN WHITE LIST?
NO
YES

507 SELECT CANDIDATE LIST WITH RESPECT TO APPS

509 APP SELECTED AS CANDIDATE = EXCEPTIONAL CASE?
YES
NO

511 AUTOMATICALLY LIMIT CPU USAGE AMOUNT OF APP

513 DISPLAY RESULT OF LIMITING CPU USAGE AMOUNT OF APP

515 TRANSMIT INFORMATION ON WHITE LIST UPDATE AND RESULT OF WHITE LIST UPDATE TO SERVER

END

ELECTRONIC DEVICE AND METHOD FOR REDUCED POWER CONSUMPTION

CROSS-REFERENCE TO RELATED APPLICATIONS

This application is a continuation of application Ser. No. 15/642,257, filed Jul. 5, 2017, which is related to and claims priority under 35 U.S.C. § 119(a) of a Korean patent application filed on Jun. 29, 2016, in the Korean Intellectual Property Office and assigned Serial No. 10-2016-0097554, the entire disclosures of each are hereby incorporated by reference.

BACKGROUND

1. Field

The present disclosure relates to a method and an apparatus for reducing power consumption of an electronic device.

2. Description of Related Art

With the development of information and communication technology and semiconductor technology, mobile electronic devices, for example, smart phones, have become the necessities of modern life. Users can be provided with various services through installation of various applications in smart phones. For example, using a smart phone, a user can check his/her schedules, confirm news, or communicate with other users through connection to Social Network Services/sites (SNS).

SUMMARY

Recently, the time that a user uses a smart phone is on a gradually increasing trend. Although the usage time of a smart phone is gradually increasing, the usage time of a battery, which is a power supply source of the smart phone, has been limited. Accordingly, there is a need to reduce power consumption of the smart phone.

To address the above-discussed deficiencies, it is a primary object to provide a method and an apparatus for reducing power consumption of an electronic device.

According to various embodiments of the present disclosure, a method for operating an electronic device includes executing an app in response to a first user input; switching the app to a background in response to a second user input; confirming whether the app that has been switched to the background satisfies at least one condition; automatically limiting an operation of the app if the app that has been switched to the background satisfies the at least one condition; and displaying a report of the result of the automatic limitation of the app operation.

According to various embodiments of the present disclosure, an electronic device includes a processor, wherein the processor is configured to execute an app in response to a first user input, to switch the app to a background in response to a second user input, to confirm whether the app that has been switched to the background satisfies at least one condition, to automatically limit an operation of the app if the app that has been switched to the background satisfies the at least one condition, and to display a report of the result of the automatic limitation of the app operation.

According to the various embodiments of the present disclosure, since the operation of the app that abnormally uses a CPU in the background is limited, unnecessary CPU usage and power consumption can be reduced, and thus the usage time of the battery can be increased.

According to the various embodiments of the present disclosure, the usage time of a battery can be predicted and provided to the user based on the result of limiting the operation of the app that abnormally uses the CPU through the electronic device.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 1 illustrates an electronic device in a network environment according to various embodiments of the present disclosure;

FIG. 3 illustrates the configuration of a program module according to various embodiments of the present disclosure;

FIG. 5 illustrates a method for reducing power consumption of an electronic device according to various embodiments of the present disclosure;

3

Figure 10:
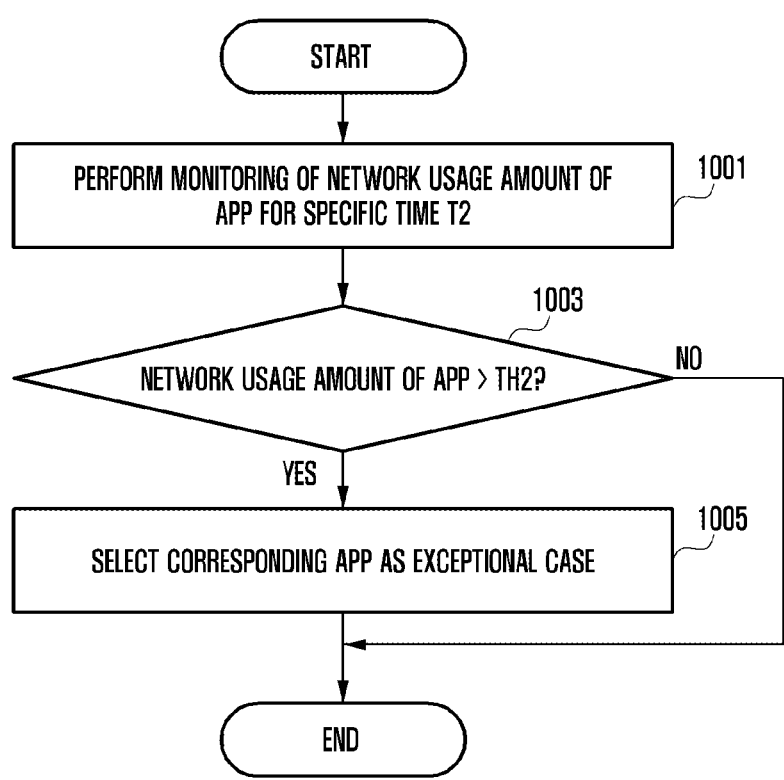
Figure 11:
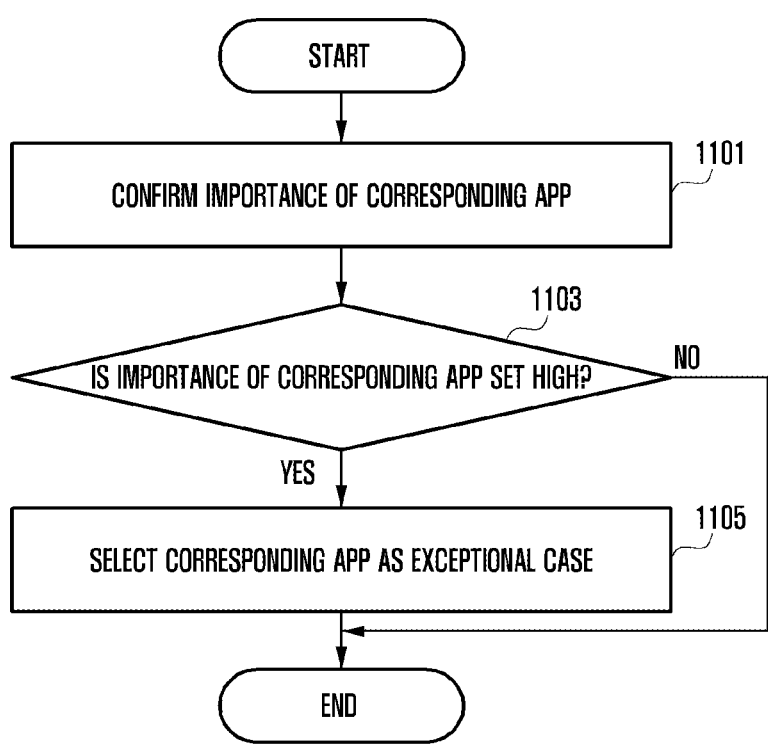
Figure 12:
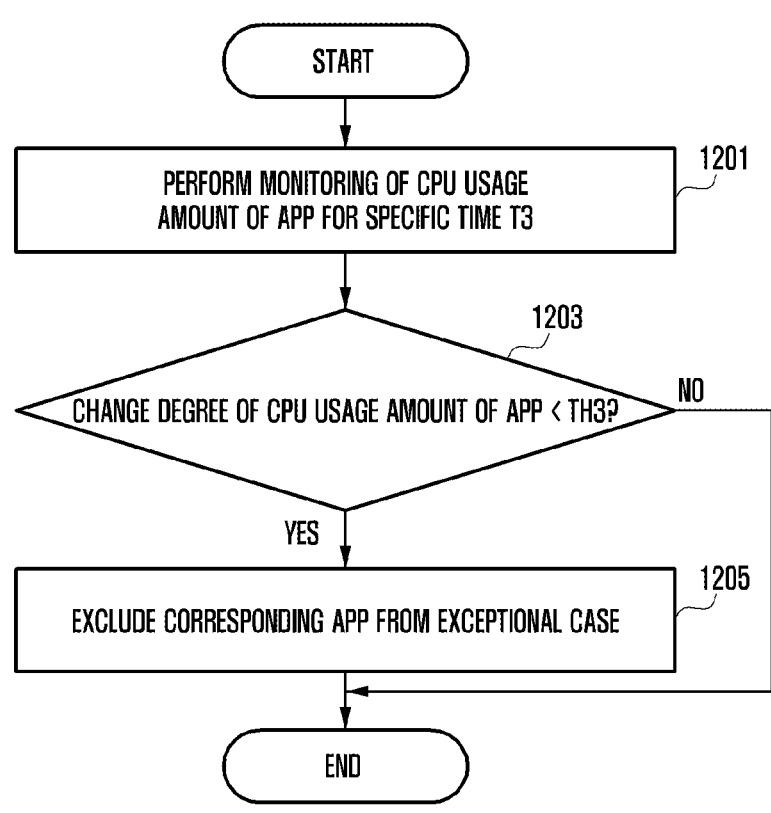
Figure 13:
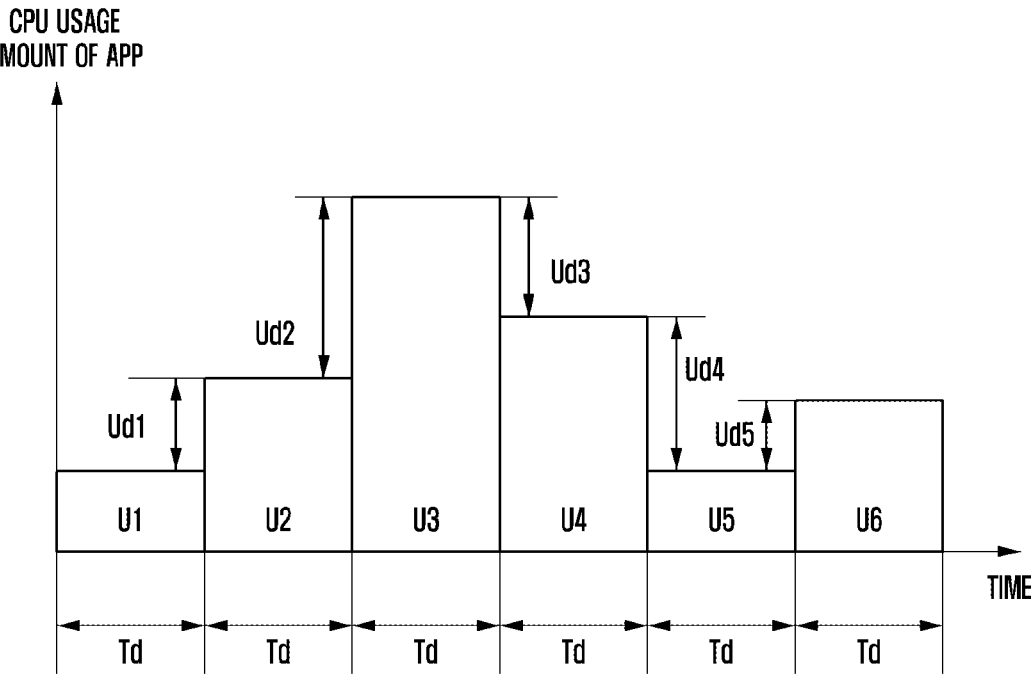
Figure 14:
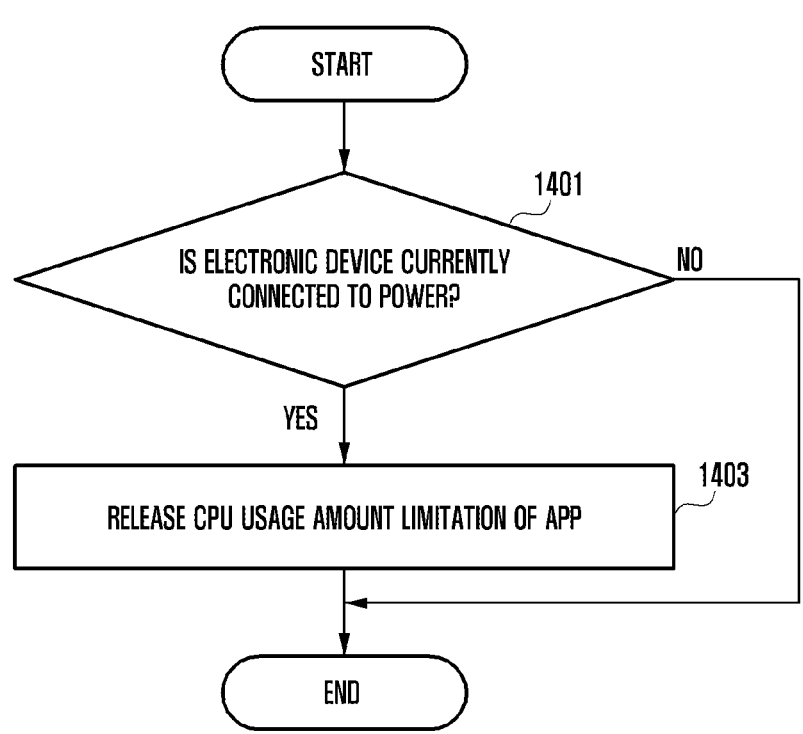
Figure 15:
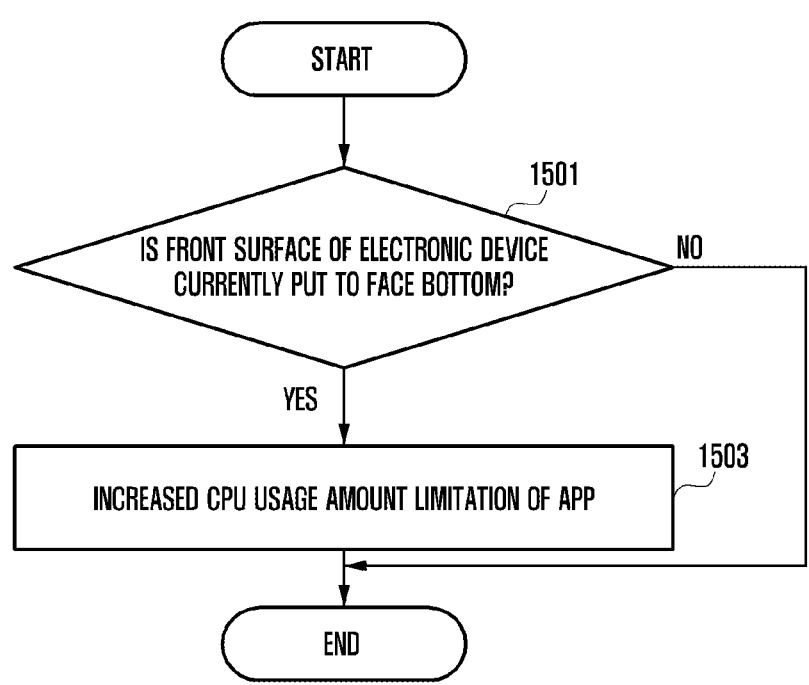
Figure 16:
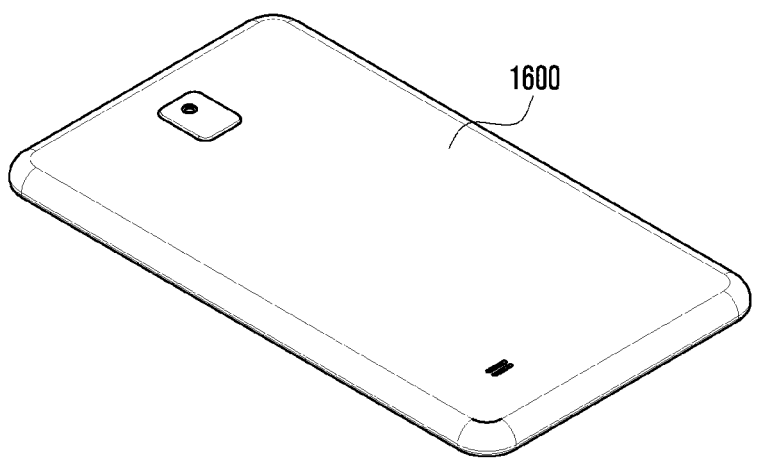
Figure 17:
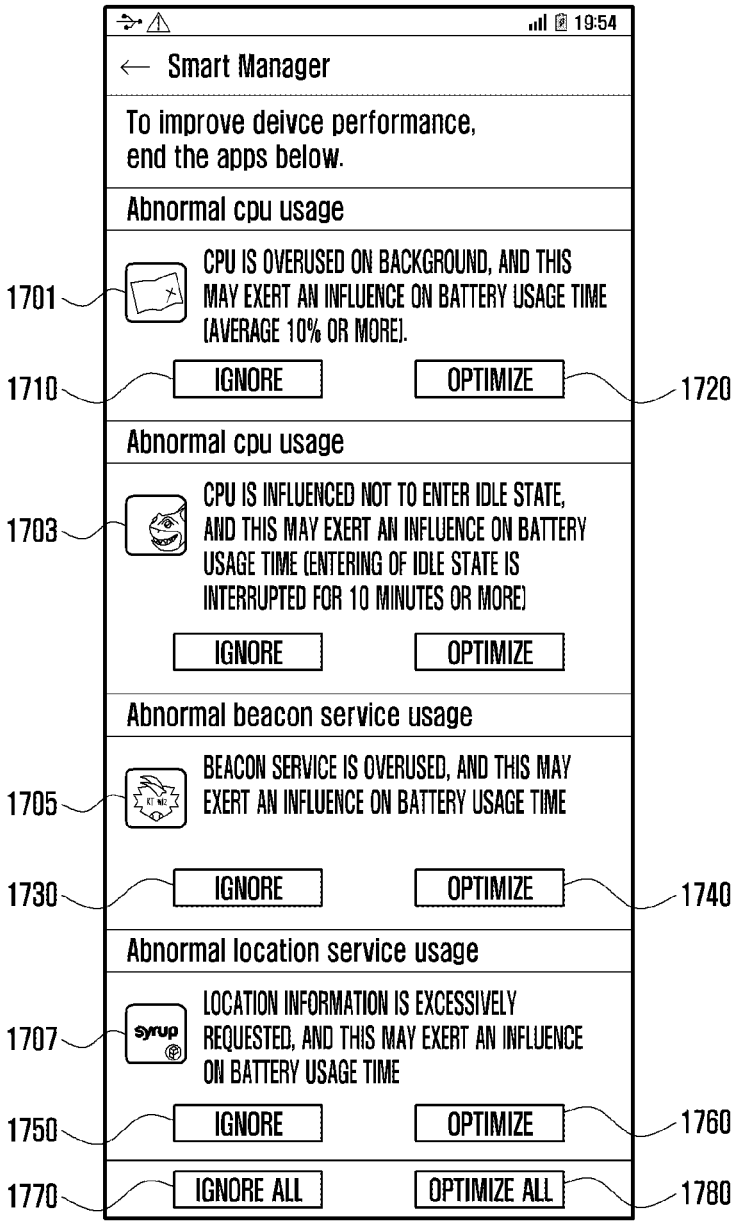
Figure 18:
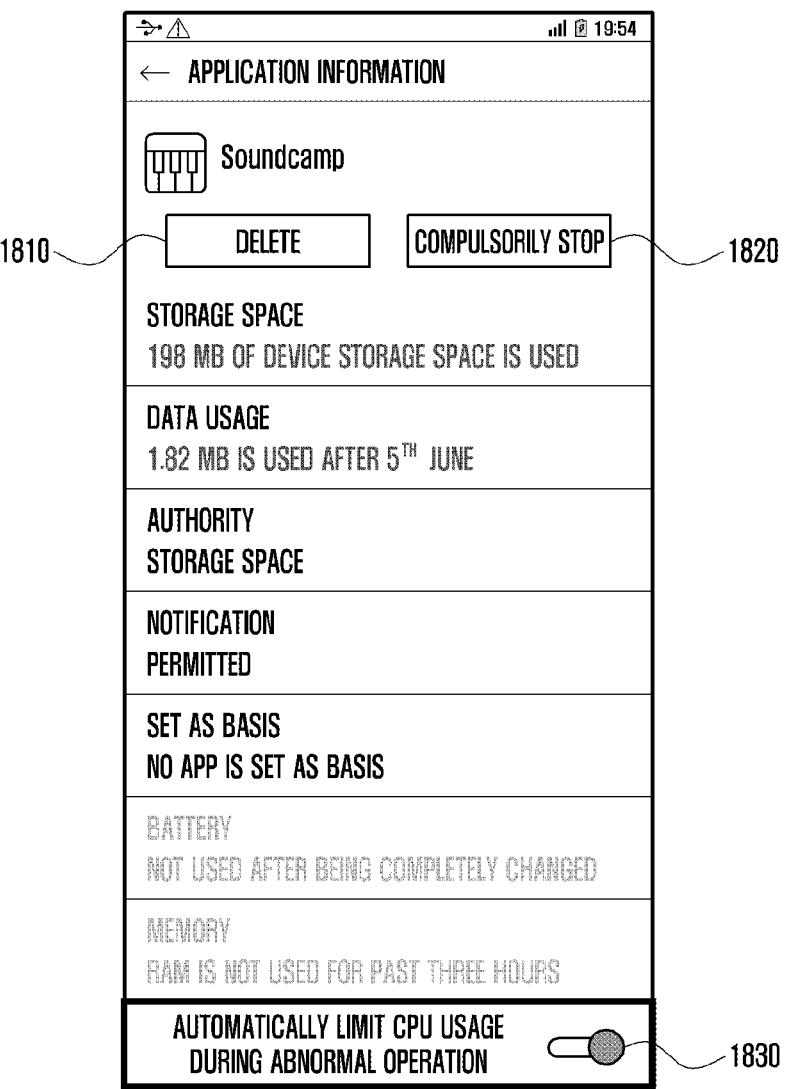
Figure 19:
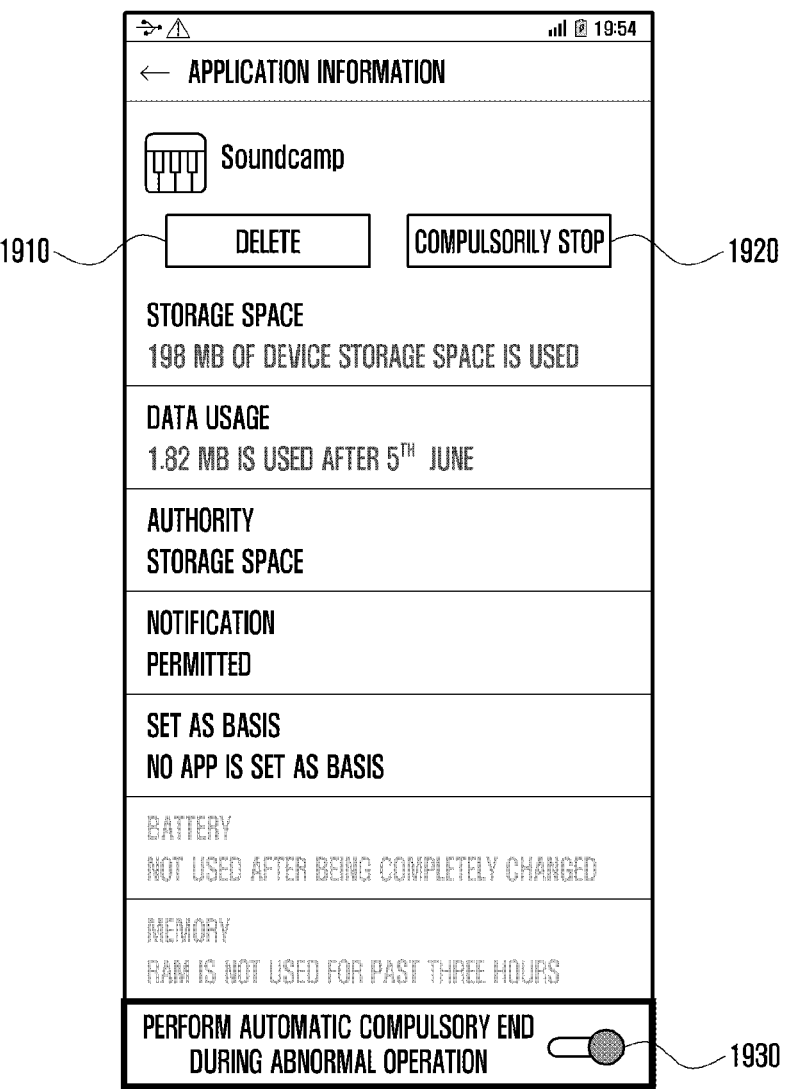
Figure 20:
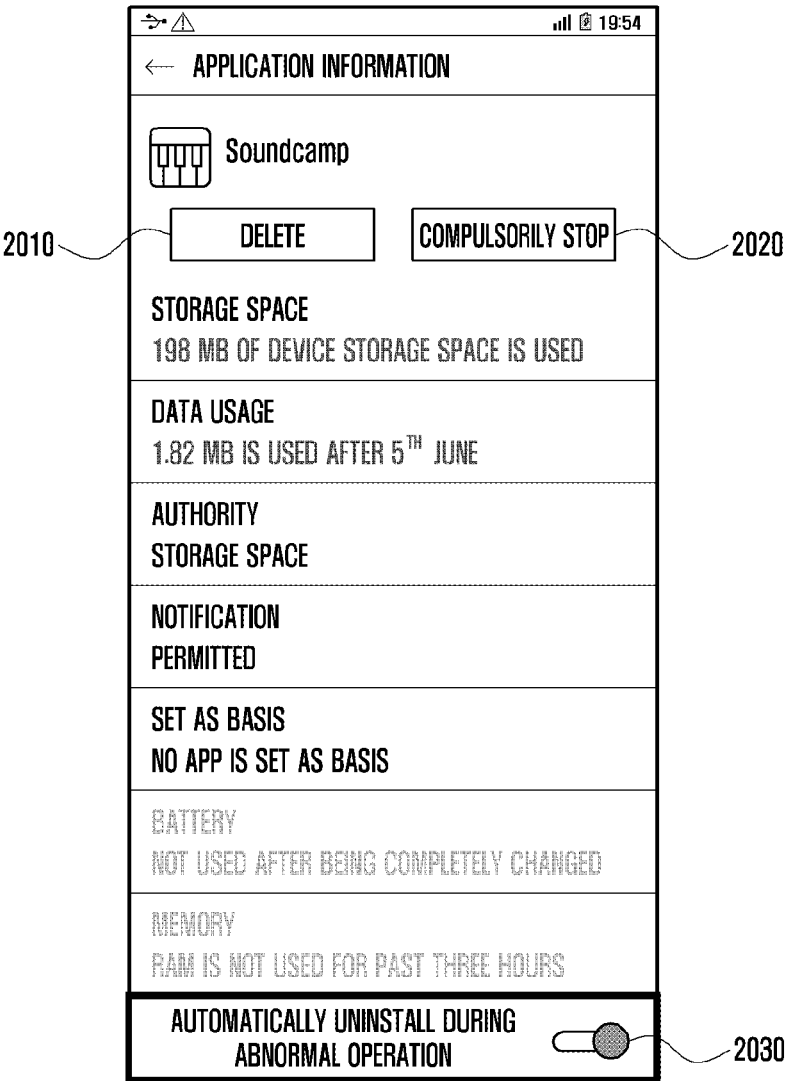
Figure 21A:
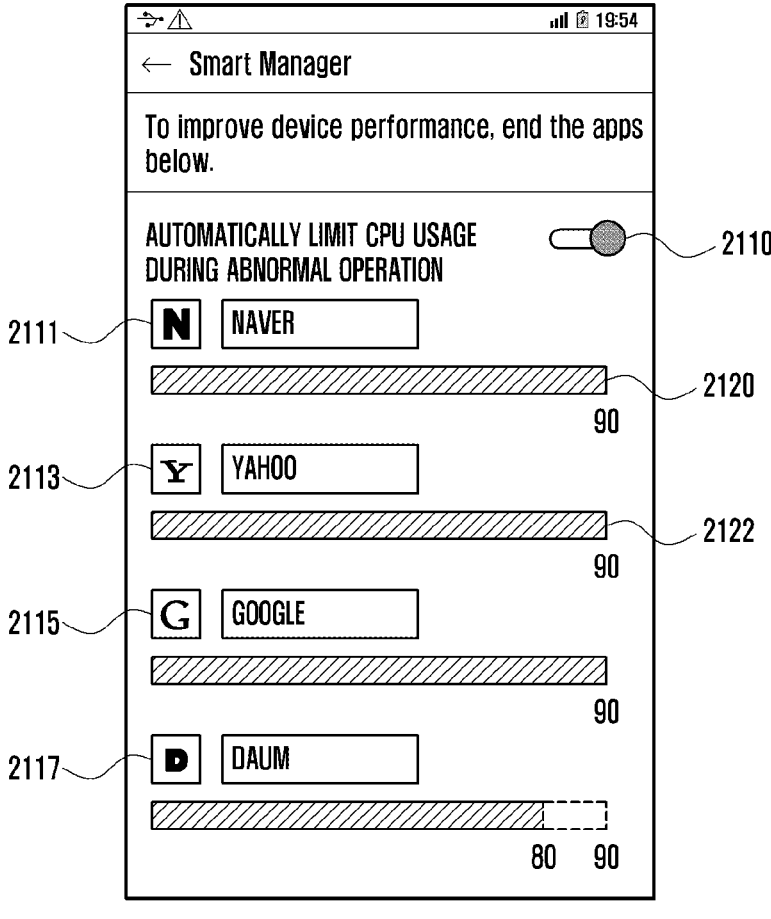
Figure 21B:
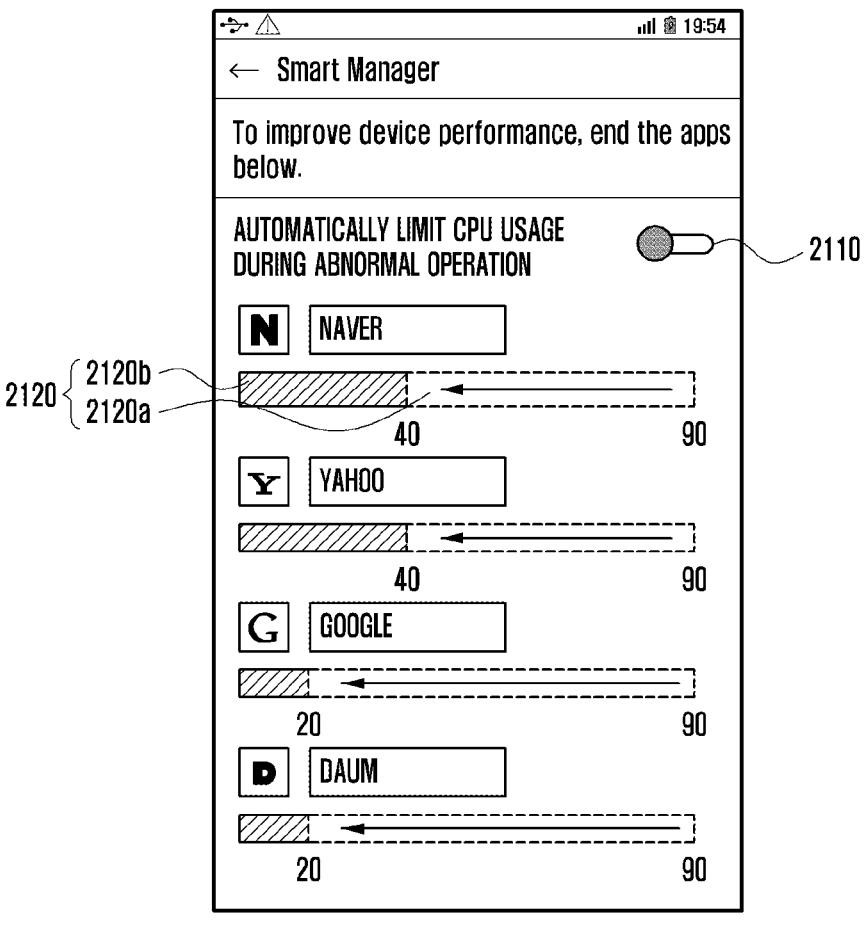

FIG. 10 illustrates a method for an electronic device to select an exceptional case from apps that are selected as a candidate list according to another embodiment of the present disclosure;

FIG. 11 illustrates a method for an electronic device to select an exceptional case from apps that are selected as a candidate list according to various embodiments of the present disclosure;

FIG. 12 illustrates a process for an electronic device to exclude a specific app from an exceptional case according to various embodiments of the present disclosure;

FIG. 13 illustrates a process for an electronic device to exclude a specific app from an exceptional case according to various embodiments of the present disclosure;

FIG. 14 illustrates an exceptional case in which an electronic device does not limit an operation of an app according to various embodiments of the present disclosure;

FIG. 15 illustrates an exceptional case in which an electronic device increases an amount of limitation of an operation of an app according to various embodiments of the present disclosure;

FIG. 16 illustrates an exceptional case in which an electronic device increases an amount of limitation of an operation of an app according to various embodiments of the present disclosure;

FIG. 17 illustrates a screen showing the result of app monitoring that is provided from an electronic device according to an embodiment of the present disclosure;

FIG. 18 illustrates a screen showing user selection for solving a battery overconsumption problem of an app;

FIG. 19 illustrates a screen showing user selection for solving a battery overconsumption problem of an app;

FIG. 20 illustrates a screen showing user selection for solving a battery overconsumption problem of an app; and FIGS. 21A and 21B illustrate a screen for selecting whether an electronic device automatically limits an abnormal operation of an app according to various embodiments of the present disclosure.

DETAILED DESCRIPTION

FIGS. 1 through 21B, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged electronic device.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" may denote the presence of the disclosed functions, operations, and constituent elements and do not limit one or more additional functions, operations, and constituent elements. Terms such as "include" and/or "have" may be construed to denote a certain characteristic, number, operation, constituent element, component or a combination thereof, but may not be construed to exclude the existence of or a possibility of addition of one or more other characteristics, numbers, operations, constituent elements, components or combinations thereof.

Furthermore, in the present disclosure, the expression "and/or" includes any and all combinations of the associated listed words. For example, the expression "A and/or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to another component, it should be understood that not only the component is directly connected or accessed to the other component, but also there may exist another component between them. Meanwhile, in the case where a component is referred to as being "directly connected" or "directly accessed" to the other component, it should be understood that there is no component therebetween. The terms used in the present disclosure are only used to describe specific various embodiments, and are not intended to limit the present disclosure. As used herein, the singular forms are intended to include the plural forms as well, unless the context clearly indicates otherwise. Singular forms are intended to include plural forms unless the context clearly indicates otherwise.

An electronic device according to the present disclosure may be a device including a communication function. For example, the device corresponds to a combination of at least one of a smartphone, a tablet personal computer (PC), a mobile phone, a video phone, an e-book reader, a desktop PC, a laptop PC, a netbook computer, a personal digital assistant (PDA), a portable multimedia player (PMP), a digital audio player, a mobile medical device, an electronic bracelet, an electronic necklace, an electronic accessory, a camera, a wearable device, an electronic clock, a wrist watch, home appliances (for example, an air-conditioner, vacuum, an oven, a microwave, a washing machine, an air cleaner, and the like), an artificial intelligence robot, a television (TV), a digital video disk (DVD) player, an audio device, various medical devices (for example, magnetic resonance angiography (MRA), magnetic resonance imaging (MRI), computed tomography (CT), a scanning machine, a ultrasonic wave device, or the like), a navigation device, a global positioning system (GPS) receiver, an event data recorder (EDR), a Flight data recorder (FDR), a set-top box, a TV box (for example, SAMSUNG HOMESYNC™, APPLE TV®, or GOOGLE TV®), an electronic dictionary, a vehicle infotainment device, an electronic equipment for a ship (for example, navigation equipment for a ship, gyrocompass, or the like), avionics, a security device, electronic clothes, an electronic key, a camcorder, game consoles, a head-mounted display (HMD), a flat panel display device, an electronic frame, an electronic album, furniture or a portion of a building/structure that includes a communication function, an electronic board, an electronic signature receiving device, a projector, and the like. It is obvious to those skilled in the art that the electronic device according to the present disclosure is not limited to the aforementioned devices.

FIG. 1 illustrates a configuration of an electronic device according to an embodiment of the present disclosure.

Referring to FIG. 1, the electronic device 100 may include a bus 110, a processor 120, a memory 130, an input/output (IO) interface 150, a display module 160, a communication interface 170, and other similar and/or suitable components.

The bus 110 may be a circuit that interconnects the above-described elements and delivers a communication (e.g., a control message) between the above-described elements.

The processor 120 may receive commands from the above-described other elements (e.g., the memory 130, the IO interface 150, the display module 160, the communication interface 170, etc.) through the bus 110, may interpret the received commands, and may execute calculation or data processing according to the interpreted commands.

The memory 130 may store commands or data received from the processor 120 or other elements (e.g., the IO interface 150, the display module 160, the communication interface 170, etc.) or generated by the processor 120 or the other elements. The memory 130 may include programming modules 140, such as a kernel 141, middleware 143, an application programming interface (API) 145, one or more applications 147, and the like. Each of the above-described programming modules may be implemented in software, firmware, hardware, or a combination of two or more thereof.

The kernel 141 may control or manage system resources (e.g., the bus 110, the processor 120, the memory 130, etc.) used to execute operations or functions implemented by other programming modules (e.g., the middleware 143, the API 145, and the applications 147). Also, the kernel 141 may provide an interface capable of accessing and controlling or managing the individual elements of the electronic device 100 by using the middleware 143, the API 145, or the application 147.

The middleware 143 may serve to go between the API 145 or the application 147 and the kernel 141 in such a manner that the API 145 or the applications 147 communicates with the kernel 141 and exchanges data therewith. Also, in relation to work requests received from one or more applications 147 and/or the middleware 143, for example, may perform load balancing of the work requests by using a method of assigning a priority, in which system resources (e.g., the bus 110, the processor 120, the memory 130, etc.) of the electronic device 100 can be used, to at least one of the one or more applications 147.

The API 145 is an interface through which the applications 147 is capable of controlling a function provided by the kernel 141 or the middleware 143, and may include, for example, at least one interface or function for file control, window control, image processing, character control, or the like.

The IO interface 150, for example, may receive a command or data as input from a user, and may deliver the received command or data to the processor 120 or the memory 130 through the bus 110. The display module 160 may display a video, an image, data, or the like to the user.

The communication interface 170 may connect communication between another electronic device 102 and the electronic device 100. The communication interface 170 may support a predetermined short-range communication protocol (e.g., WI-FI®, BLUETOOTH® (BT), and near field communication (NFC)), or predetermined network communication 162 (e.g., the Internet, a local area network (LAN), a wide area network (WAN), a telecommunication network, a cellular network, a satellite network, a plain old telephone service (POTS), or the like). Each of the electronic devices 102 and 104 may be a device that is identical (e.g., of an identical type) to or different (e.g., of a different type) from the electronic device 100. Further, the communication interface 170 may connect communication between a server 106 and the electronic device 100 via the network 162.

Figure 2:
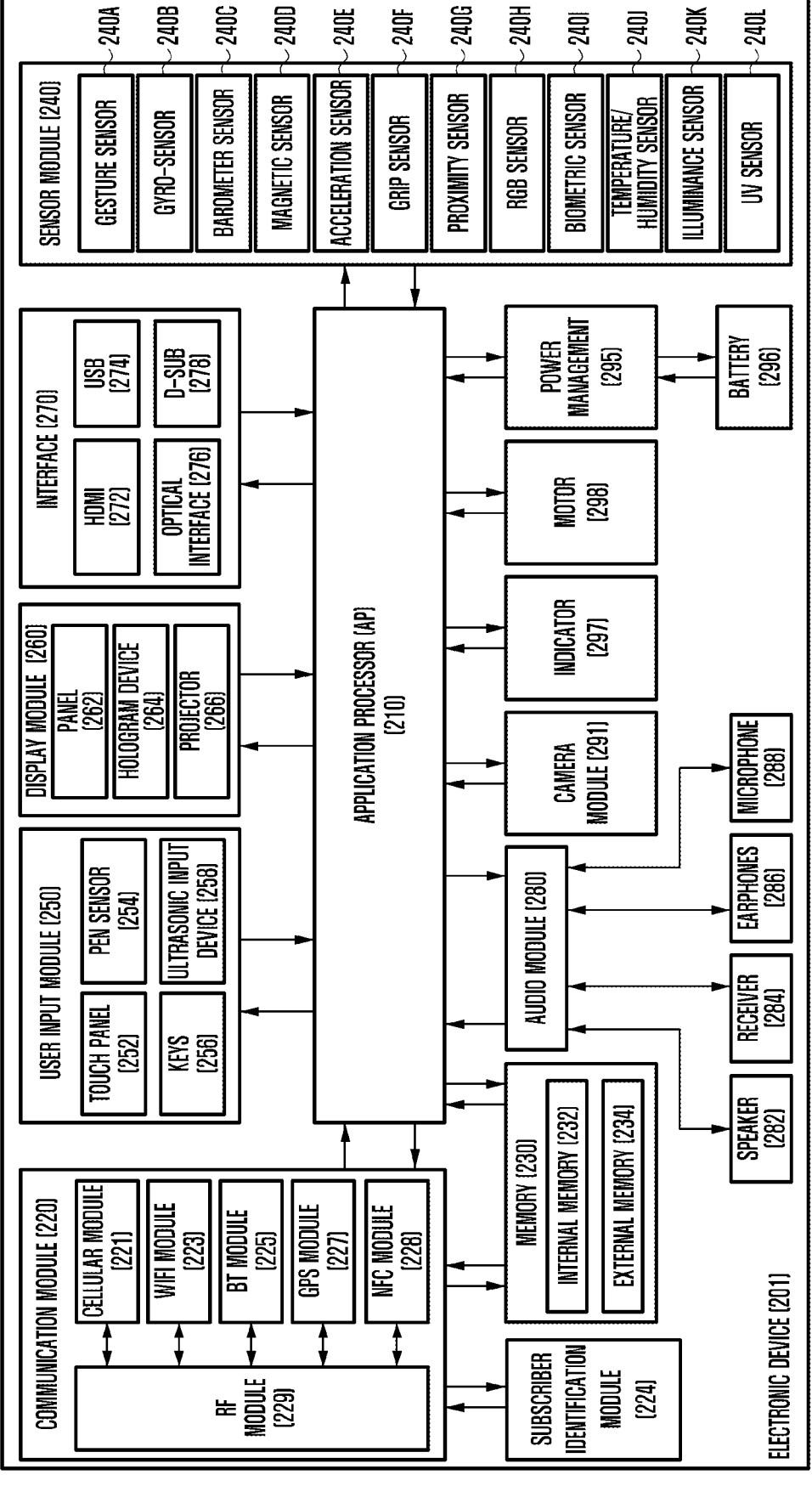
FIG. 2 illustrates the configuration of an electronic device according to various embodiments of the present disclosure.

FIG. 2 illustrates a configuration of an electronic device 201 according to an embodiment of the present disclosure.

The hardware may be, for example, the electronic device 100 illustrated in FIG. 1.

Referring to FIG. 2, the electronic device may include one or more processors 210, a communication module 220, a subscriber identification module (SIM) card 224, a memory 230, a sensor module 240, a input device 250, a display module 260, an interface 270, an audio module 280, a camera module 291, a power management module 295, a battery 296, an indicator 297, a motor 298, and any other similar and/or suitable components.

The application processor (AP) 210 (e.g., the processor 120) may include one or more application processors (APs), or one or more communication processors (CPs). The processor 210 may be, for example, the processor 120 illustrated in FIG. 1. The AP 210 is illustrated as being included in the processor 210 in FIG. 2, but may be included in different integrated circuit (IC) packages, respectively. According to an embodiment of the present disclosure, the AP 210 may be included in one IC package.

The AP 210 may execute an operating system (OS) or an application program, and thereby may control multiple hardware or software elements connected to the AP 210 and may perform processing of and arithmetic operations on various data including multimedia data. The AP 210 may be implemented by, for example, a system on chip (SoC). According to an embodiment of the present disclosure, the AP 210 may further include a graphical processing unit (GPU) (not illustrated).

The AP 210 may manage a data line and may convert a communication protocol in the case of communication between the electronic device (e.g., the electronic device 100) including the hardware 200 and different electronic devices connected to the electronic device through the network. The AP 210 may be implemented by, for example, a SoC. According to an embodiment of the present disclosure, the AP 210 may perform at least some of multimedia control functions. The AP 210, for example, may distinguish and authenticate a terminal in a communication network by using a subscriber identification module (e.g., the SIM card 224). Also, the AP 210 may provide the user with services, such as a voice telephony call, a video telephony call, a text message, packet data, and the like.

Further, the AP 210 may control the transmission and reception of data by the communication module 220. In FIG. 2, the elements such as the AP 210, the power management module 295, the memory 230, and the like are illustrated as elements separate from the AP 210. However, according to an embodiment of the present disclosure, the AP 210 may include at least some (e.g., the CP) of the above-described elements.

According to an embodiment of the present disclosure, the AP 210 may load, to a volatile memory, a command or data received from at least one of a non-volatile memory and other elements connected to each of the AP 210, and may process the loaded command or data. Also, the AP 210 may store, in a non-volatile memory, data received from or generated by at least one of the other elements.

The SIM card 224 may be a card implementing a subscriber identification module, and may be inserted into a slot formed in a particular portion of the electronic device 100. The SIM card 224 may include unique identification information (e.g., integrated circuit card identifier (ICCID)) or subscriber information (e.g., international mobile subscriber identity (IMSI)).

The memory 230 may include an internal memory 232 and an external memory 234. The memory 230 may be, for example, the memory 130 illustrated in FIG. 1. The internal memory 232 may include, for example, at least one of a volatile memory (e.g., a dynamic RAM (DRAM), a static RAM (SRAM), a synchronous dynamic RAM (SDRAM), etc.), and a non-volatile memory (e.g., a one time programmable ROM (OTPROM), a programmable ROM (PROM), an erasable and programmable ROM (EPROM), an electrically erasable and programmable ROM (EEPROM), a mask ROM, a flash ROM, a Not AND (NAND) flash memory, a Not OR (NOR) flash memory, etc.). According to an embodiment of the present disclosure, the internal memory 232 may be in the form of a solid state drive (SSD). The external memory 234 may further include a flash drive, for example, a compact flash (CF), a secure digital (SD), a micro-secure digital (Micro-SD), a mini-secure digital (Mini-SD), an extreme digital (xD), a memory stick, or the like.

The communication module 220 may include a cellular module 221, a wireless communication module, or a radio frequency (RF) module 229. The communication module 220 may be, for example, the communication interface 170 illustrated in FIG. 1. The communication module 220 may include, for example, a Wi-Fi module 223, a BT module 225, a GPS module 227, or a NFC module 228. For example, the communication module 220 may provide a wireless communication function by using a radio frequency. Additionally or alternatively, the communication module 220 may include a network interface (e.g., a LAN card), a modulator/demodulator (modem), or the like for connecting the hardware 200 to a network (e.g., the Internet, a LAN, a WAN, a telecommunication network, a cellular network, a satellite network, a POTS, or the like).

The RF module 229 may be used for transmission and reception of data, for example, transmission and reception of RF signals or called electronic signals. Although not illustrated, the RF module 229 may include, for example, a transceiver, a power amplifier module (PAM), a frequency filter, a low noise amplifier (LNA), or the like. Also, the RF module 229 may further include a component for transmitting and receiving electromagnetic waves in a free space in a wireless communication, for example, a conductor, a conductive wire, or the like.

The sensor module 240 may include, for example, at least one of a gesture sensor 240A, a gyro sensor 240B, a barometer sensor 240C, a magnetic sensor 240D, an acceleration sensor 240E, a grip sensor 240F, a proximity sensor 240G, a red, green and blue (RGB) sensor 240H, a biometric sensor 240I, a temperature/humidity sensor 240J, an illuminance sensor 240K, and a ultra violet (UV) sensor 240L. The sensor module 240 may measure a physical quantity or may sense an operating state of the electronic device 100, and may convert the measured or sensed information to an electrical signal. Additionally or alternatively, the sensor module 240 may include, for example, an E-nose sensor (not illustrated), an electromyography (EMG) sensor (not illustrated), an electroencephalogram (EEG) sensor (not illustrated), an electrocardiogram (ECG) sensor (not illustrated), a fingerprint sensor (not illustrated), and the like. Additionally or alternatively, the sensor module 240 may include, for example, an E-nose sensor (not illustrated), an EMG sensor (not illustrated), an EEG sensor (not illustrated), an ECG sensor (not illustrated), a fingerprint sensor, and the like. The sensor module 240 may further include a control circuit (not illustrated) for controlling one or more sensors included therein.

The input device 250 may include a touch panel 252, a pen sensor 254 (e.g., a digital pen sensor), keys 256, and an ultrasonic input unit 258. The input device 250 may be, for example, the user input module 150 illustrated in FIG. 1. The touch panel 252 may recognize a touch input in at least one of, for example, a capacitive scheme, a resistive scheme, an infrared scheme, and an acoustic wave scheme. Also, the touch panel 252 may further include a controller (not illustrated). In the capacitive type, the touch panel 252 is capable of recognizing proximity as well as a direct touch. The touch panel 252 may further include a tactile layer (not illustrated). In this event, the touch panel 252 may provide a tactile response to the user.

The pen sensor 254 (e.g., a digital pen sensor), for example, may be implemented by using a method identical or similar to a method of receiving a touch input from the user, or by using a separate sheet for recognition. For example, a key pad or a touch key may be used as the keys 256. The ultrasonic input unit 258 enables the terminal to sense a sound wave by using a microphone (e.g., a microphone 288) of the terminal through a pen generating an ultrasonic signal, and to identify data. The ultrasonic input unit 258 is capable of wireless recognition. According to an embodiment of the present disclosure, the hardware may receive a user input from an external device (e.g., a network, a computer, or a server), which is connected to the communication module 220, through the communication module 220.

The display module 260 may include a panel 262, a hologram device 264, or projector 266. The display module 260 may be, for example, the display module 160 illustrated in FIG. 1. The panel 262 may be, for example, a liquid crystal display (LCD) and an active matrix organic light emitting diode (AM-OLED) display, and the like. The panel 262 may be implemented so as to be, for example, flexible, transparent, or wearable. The panel 262 may include the touch panel 252 and one module. The hologram device 264 may display a three-dimensional image in the air by using interference of light. According to an embodiment of the present disclosure, the display module 260 may further include a control circuit for controlling the panel 262 or the hologram 264.

The interface 270 may include, for example, a high-definition multimedia interface (HDMI) 272, a universal serial bus (USB) 274, an optical interface 276, and a D-subminiature (D-sub) 278. Additionally or alternatively, the interface 270 may include, for example, SD/multi-media card (MMC) (not illustrated) or infrared data association (IrDA) (not illustrated).

The audio codec 280 may bidirectionally convert between a voice and an electrical signal. The audio codec 280 may convert voice information, which is input to or output from the audio codec 280, through, for example, a speaker 282, a receiver 284, an earphone 286, the microphone 288 or the like.

The camera module 291 may capture an image and a moving image. According to an embodiment, the camera module 291 may include one or more image sensors (e.g., a front lens or a back lens), an image signal processor (ISP) (not illustrated), and a flash LED (not illustrated).

The power management module 295 may manage power of the hardware 200. Although not illustrated, the power management module 295 may include, for example, a power management integrated circuit (PMIC), a charger integrated circuit (IC), or a battery fuel gauge.

The PMIC may be mounted to, for example, an IC or a SoC semiconductor. Charging methods may be classified into a wired charging method and a wireless charging method. The charger IC may charge a battery, and may prevent an overvoltage or an overcurrent from a charger to the battery. According to an embodiment of the present disclosure, the charger IC may include a charger IC for at least one of the wired charging method and the wireless charging method. Examples of the wireless charging method may include a magnetic resonance method, a magnetic induction method, an electromagnetic method, and the like. Additional circuits (e.g., a coil loop, a resonance circuit, a rectifier, etc.) for wireless charging may be added in order to perform the wireless charging.

The battery fuel gauge may measure, for example, a residual quantity of the battery 296, or a voltage, a current or a temperature during the charging. The battery 296 may supply power by generating electricity, and may be, for example, a rechargeable battery.

The indicator 297 may indicate particular states of the hardware 200 or a part (e.g., the AP 211) of the hardware 200, for example, a booting state, a message state, a charging state and the like. The motor 298 may convert an electrical signal into a mechanical vibration. The processor 210 may control the sensor module 240.

Although not illustrated, the hardware 200 may include a processing unit (e.g., a GPU) for supporting a module TV. The processing unit for supporting a module TV may process media data according to standards such as, for example, digital multimedia broadcasting (DMB), digital video broadcasting (DVB), media flow, and the like. Each of the above-described elements of the hardware 200 according to an embodiment of the present disclosure may include one or more components, and the name of the relevant element may change depending on the type of electronic device. The hardware according to an embodiment of the present disclosure may include at least one of the above-described elements. Some of the above-described elements may be omitted from the hardware, or the hardware may further include additional elements. Also, some of the elements of the hardware according to an embodiment of the present disclosure may be combined into one entity, which may perform functions identical to those of the relevant elements before the combination.

The term "module" used in the present disclosure may refer to, for example, a unit including one or more combinations of hardware, software, and firmware. The "module" may be interchangeable with a term, such as "unit," "logic," "logical block," "component," "circuit," or the like. The "module" may be a minimum unit of a component formed as one body or a part thereof. The "module" may be a minimum unit for performing one or more functions or a part thereof. The "module" may be implemented mechanically or electronically. For example, the "module" according to an embodiment of the present disclosure may include at least one of an application-specific integrated circuit (ASIC) chip, a field-programmable gate array (FPGA), and a programmable-logic device for performing certain operations that have been known or are to be developed in the future.

FIG. 3 illustrates a configuration of a programming module 310 according to an embodiment of the present disclosure.

The programming module 310 may be included (or stored) in the electronic device 100 (e.g., the memory 130) or may be included (or stored) in the electronic device 201 (e.g., the memory 230) illustrated in FIG. 1. At least a part of the programming module 310 may be implemented in software, firmware, hardware, or a combination of two or more thereof. The programming module 310 may be implemented in hardware (e.g., the hardware 200), and may include an OS controlling resources related to an electronic device (e.g., the electronic device 100) and/or various applications (e.g., an application 370) executed in the OS. For example, the OS may be ANDROID®, iOS®, WINDOWS®, SYMBIAN™, TIZEN®, SAMSUNG BADA®, and the like.

Referring to FIG. 3, the programming module 310 may include a kernel 320, a middleware 330, an API 360, and/or the application 370.

The kernel 320 (e.g., the kernel 141) may include a system resource manager 321 and/or a device driver 323. The system resource manager 321 may include, for example, a process manager (not illustrated), a memory manager (not illustrated), and a file system manager (not illustrated). The system resource manager 321 may perform the control, allocation, recovery, and/or the like of system resources. The device driver 323 may include, for example, a display driver (not illustrated), a camera driver (not illustrated), a BLUETOOTH® driver (not illustrated), a shared memory driver (not illustrated), a USB driver (not illustrated), a keypad driver (not illustrated), a Wi-Fi driver (not illustrated), and/or an audio driver (not illustrated). Also, according to an embodiment of the present disclosure, the device driver 323 may include an inter-process communication (IPC) driver (not illustrated).

The middleware 330 may include multiple modules previously implemented so as to provide a function used in common by the applications 370. Also, the middleware 330 may provide a function to the applications 370 through the API 360 in order to enable the applications 370 to efficiently use limited system resources within the electronic device. For example, as illustrated in FIG. 3, the middleware 330 (e.g., the middleware 143) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and any other suitable and/or similar manager.

The runtime library 335 may include, for example, a library module used by a complier, in order to add a new function by using a programming language during the execution of the application 370. According to an embodiment of the present disclosure, the runtime library 335 may perform functions that are related to input and output, the management of a memory, an arithmetic function, and/or the like.

The application manager 341 may manage, for example, a life cycle of at least one of the applications 370. The window manager 342 may manage GUI resources used on the screen. The multimedia manager 343 may detect a format used to reproduce various media files and may encode or decode a media file through a codec appropriate for the relevant format. The resource manager 344 may manage resources, such as a source code, a memory, a storage space, and/or the like of at least one of the applications 370.

The power manager 345 may operate together with a basic input/output system (BIOS), may manage a battery or power, and may provide power information and the like used for an operation. The database manager 346 may manage a database in such a manner as to enable the generation, search and/or change of the database to be used by at least one of the applications 370. The package manager 347 may manage the installation and/or update of an application distributed in the form of a package file.

The connectivity manager 348 may manage a wireless connectivity such as, for example, WI-FI® and BLU-ETOOTH®. The notification manager 349 may display or report, to the user, an event such as an arrival message, an appointment, a proximity alarm, and the like in such a manner as not to disturb the user. The location manager 350 may manage location information of the electronic device. The graphic manager 351 may manage a graphic effect, which is to be provided to the user, and/or a user interface related to the graphic effect. The security manager 352 may provide various security functions used for system security, user authentication, and the like. According to an embodiment of the present disclosure, when the electronic device (e.g., the electronic device 100) has a telephone function, the middleware 330 may further include a telephony manager (not illustrated) for managing a voice telephony call function and/or a video telephony call function of the electronic device.

The middleware 330 may generate and use a new middleware module through various functional combinations of the above-described internal element modules. The middleware 330 may provide modules specialized according to types of OSs in order to provide differentiated functions. Also, the middleware 330 may dynamically delete some of the existing elements, or may add new elements. Accordingly, the middleware 330 may omit some of the elements described in the various embodiments of the present disclosure, may further include other elements, or may replace the some of the elements with elements, each of which performs a similar function and has a different name.

The API 360 (e.g., the API 145) is a set of API programming functions, and may be provided with a different configuration according to an OS. In the case of ANDROID® or iOS®, for example, one API set may be provided to each platform. In the case of TIZEN®, for example, two or more API sets may be provided to each platform.

The applications 370 (e.g., the applications 147) may include, for example, a preloaded application and/or a third party application. The applications 370 (e.g., the applications 147) may include, for example, a home application 371, a dialer application 372, a short message service (SMS)/multimedia message service (MMS) application 373, an instant message (IM) application 374, a browser application 375, a camera application 376, an alarm application 377, a contact application 378, a voice dial application 379, an electronic mail (e-mail) application 380, a calendar application 381, a media player application 382, an album application 383, a clock application 384, and any other suitable and/or similar application.

At least a part of the programming module 310 may be implemented by instructions stored in a non-transitory computer-readable storage medium. When the instructions are executed by one or more processors (e.g., the one or more processors 210), the one or more processors may perform functions corresponding to the instructions. The non-transitory computer-readable storage medium may be, for example, the memory 230. At least a part of the programming module 310 may be implemented (e.g., executed) by, for example, the one or more processors 210. At least a part of the programming module 310 may include, for example, a module, a program, a routine, a set of instructions, and/or a process for performing one or more functions.

Names of the elements of the programming module (e.g., the programming module 310) according to an embodiment of the present disclosure may change depending on the type of OS. The programming module according to an embodiment of the present disclosure may include one or more of the above-described elements. Alternatively, some of the above-described elements may be omitted from the programming module. Alternatively, the programming module may further include additional elements. The operations performed by the programming module or other elements according to an embodiment of the present disclosure may be processed in a sequential method, a parallel method, a repetitive method, or a heuristic method. Also, some of the operations may be omitted, or other operations may be added to the operations.

According to various embodiments of the present disclosure, an electronic device may include a processor, wherein the processor is configured to execute an app in response to a first user input, to switch the app to a background in response to a second user input, to confirm whether the app that has been switched to the background satisfies at least one condition, to automatically limit an operation of the app if the app that has been switched to the background satisfies the at least one condition, and to display a report of the result of the automatic limitation of the app operation.

According to an embodiment, the processor may be further configured to confirm whether the app is included in a white list or a black list, not to limit the operation of the app if the app is included in the white list, and to automatically limit the operation of the app without separately monitoring the app after switching the app to the background if the app is included in the black list.

According to an embodiment, the processor may be further configured to receive the white list from an external device, to update the white list based on a third user input, and to transmit the updated white list to the external device.

According to an embodiment, the automatically limiting the operation of the app through the processor may include limiting a CPU usage amount of the app.

According to an embodiment, the confirming whether the app that has been switched to the background satisfies the at least one condition through the processor may include confirming whether the app uses a CPU with not less than a first threshold value for a specific time on the background.

According to an embodiment, the processor may be further configured to monitor a network usage amount of the app for a specific time, and not to limit the operation of the app if the network usage amount of the app is equal to or larger than a second threshold value.

According to an embodiment, the processor may be configured to confirm importance of the app, and not to limit the operation of the app if the importance of the app is set high.

According to an embodiment, the processor may be configured to monitor a CPU usage amount of the app for a specific time, and to limit the operation of the app if a change degree of the CPU usage amount of the app is smaller than a third threshold value.

According to an embodiment, the processor may be configured to confirm whether the electronic device is connected to an external power supply, and not to limit the operation of the app if the electronic device is connected to the external power supply.

According to an embodiment, the processor may be configured to confirm whether a front surface of the electronic device is put to face a bottom, and to further heighten a limitation degree of the operation of the app if the front surface of the electronic device is put to face the bottom.

According to an embodiment, the limiting the operation of the app through the processor may further include allocating the app so that the app operates in a low-power CPU that is driven by relatively low power among a plurality of CPUs, automatically stopping the operation of the app, or automatically uninstalling the app.

According to various embodiments of the present disclosure, an electronic device may include a housing; a touch screen display exposed through a part of the housing; a battery included in the housing; a wireless communication circuit included in the housing; a processor electrically connected to the display, the battery, and the communication circuit; a nonvolatile memory electrically connected to the processor; and a volatile memory electrically connected to the processor, wherein the nonvolatile memory stores therein a first application program, and when executed, the nonvolatile memory stores instructions to cause the processor to receive a first list of a plurality of application programs using the communication circuit, to store the received first list in the nonvolatile memory, to drive the first application program on the volatile memory in a state where a user interface of the first application program is not displayed on the display, to determine whether the first application program is included in the first list while driving the first application program on the volatile memory in a state where the user interface of the first application program is not displayed on the display, to determine whether at least one parameter, which is related to power consumption according to the driving of the first application program, exceeds a threshold if the first application program is not included in the first list, and to perform an operation to reduce the power consumption by the first application program if the at least one parameter exceeds the threshold.

According to an embodiment, the at least one parameter may include confirming whether to use a CPU with not less than a first threshold value for a specific time on a background.

According to an embodiment, the reducing the power consumption may include at least one of limiting a CPU usage amount of the application and allocating the application to a low power-saving core.

According to an embodiment, the instructions may cause the processor to display information on the result of reducing the power consumption by the first application program.

In the present disclosure, the term "application (hereinafter referred to as "app") means a unit of work that can be executed in a smart phone. In the present disclosure, apps may include a photographing app, a web browser app, a music reproduction app, a voice call or video call app, an SNS app, and a game app.

In the present disclosure, the expression "app is executed on a foreground" may mean that the corresponding app is executed as an execution screen of the app is displayed on the front surface of the display. Further, in the present disclosure, the expression "app is executed on a background" may mean that the corresponding app is executed as an execution screen of the app is not displayed on the front surface of the display. In another embodiment, even in the case where the app is executed on the background, information on the execution state of the corresponding app may be displayed on a part of the display.

In the present disclosure, the expression "app is switched from a foreground to a background" may mean that the display state is changed so that the execution of the corresponding app is changed from the foreground to the background. Further, in the present disclosure, the expression "app is switched from a background to a foreground" may mean that the display state is changed so that the execution of the corresponding app is changed from the background to the foreground.

In the present disclosure, the app that has been switched from the foreground to the background may be maintained in a standby state in the memory. The app that has been switched to the background to be maintained in the standby state in the memory may be switched again to the foreground through user's selection in a multitasking selection menu. The term "standby state" may be, for example, a cached state. The app that has been switched to the cached state may be switched to the foreground in response to the user's selection input, or may be automatically ended if the user's selection is not input for a specific time. Hereinafter, the expression "app on a background operates abnormally" may mean that the app that has been switched to the standby state, for example, the cached state, operates abnormally. In the present disclosure, the expression "app operates abnormally" may mean that the corresponding app abnormally uses at least one constituent element that constitutes a hardware resource of the electronic device, for example, a CPU or a communication module.

Figure 4:
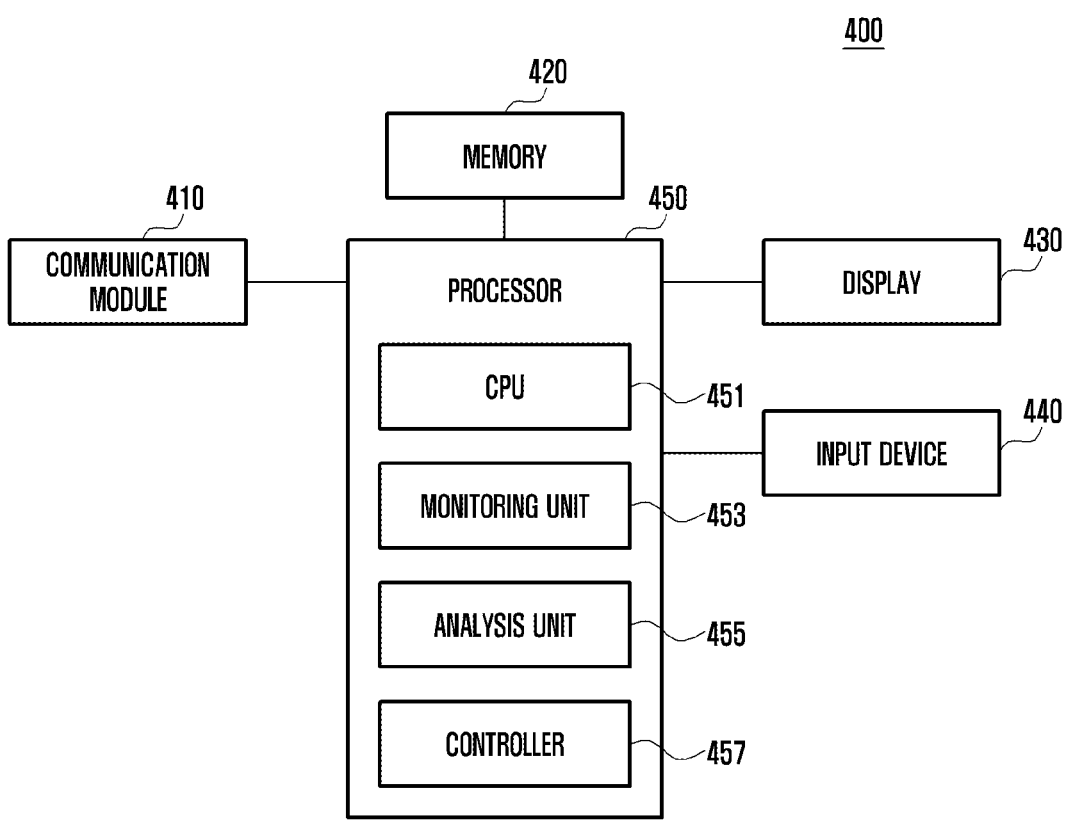
FIG. 4 illustrates the configuration of an electronic device according to various embodiments of the present disclosure.

FIG. 4 illustrates the configuration of an electronic device according to various embodiments of the present disclosure.

Referring to FIG. 4, an electronic device 400 according to various embodiments of the present disclosure may include a communication module 410, a memory 420, a display 430, an input device 440, and a processor 450.

The communication module 410 (e.g., communication module 220) may form a communication channel for a call (including voice call and video call) with a base station and a data communication channel for data transmission. The communication module 410 may include a radio frequency transmission unit that performs frequency up-conversion and amplification of a transmitted signal, a radio frequency reception unit that performs low-noise amplification and frequency down-conversion of a received signal, and a transmission/reception separation unit that separates the received signal and the transmitted signal from each other.

The memory 420 (e.g., memory 230) may store therein the Operating System (OS) of the electronic device, application programs that are required for other optional functions, for example, a sound reproduction function, an image or moving image reproduction function, and a broadcast reproduction function, and user data and data that is transmitted/received during the communication. For example, the memory 420 may store therein moving image files, game files, music files, or movie files. According to an embodiment, the memory 420 may store therein a white list or a black list that is received from a server. The white list or the black list may be a list that prescribes whether to limit the operation of a specific app if the corresponding app operates abnormally on a background.

The display 430 (e.g., display 260) may display various kinds of menus of the electronic device 400, information that is input by a user, and information that is provided to the user. For example, the display 430 may display various screens, for example, standby screen (home screen), menu screen, message preparation screen, call screen, schedule management screen, address book screen, and web page output screen, in accordance with the usage of the electronic device 400. According to an embodiment, the display 430 may visually provide a screen showing the result of monitoring a CPU usage amount of the app being executed. For example, the display 430 may provide a screen for reporting an abnormal battery consumption problem of the app and a screen for user's selection to solve the problem. The detailed explanation thereof will be described later with reference to screen exemplification diagrams. The display 430 may be formed of a Liquid Crystal Display (LCD), Organic Light emitting Diode (OLED), or Active Matrix Organic Light Emitting Diode (AMOLED). Further, in the case where the display 430 is formed in the form of a touch screen, it may operate as an input device 440.

The input device 440 (e.g., input device 250) may receive an input of figures or various pieces of text information, and may include input keys and function keys for setting various kinds of functions and controlling the function of the electronic device. The input device 440 may be composed of any one or a combination of input means, such as button type keypad, ball joystick, optical joystick, wheel key, touch key, touchpad, and touch screen.

The processor 450 (e.g., processor 210) may control the overall operation of the electronic device 400 and a signal flow between internal blocks of the electronic device 400. For example, the processor 450 may include a Central Processing Unit (CPU), a Micro Processor Unit (MPU), and an application processor.

According to an embodiment, the processor 450 may include a CPU 451, a monitoring unit 453, an analysis unit 455, or a controller 457.

The CPU 451 may be composed of a single core or multiple cores. The monitoring unit 453 may monitor the usage amount of the CPU 451 of the app being executed if the corresponding app is switched to the background. Further, the monitoring unit 453 may further monitor a network usage amount of the app being executed and a beacon usage amount for short-range communication if the corresponding app is switched to the background. The analysis unit 455 may analyze the usage amount of the CPU 451 of the monitored app, the network usage amount, or the beacon usage amount in the unit of a reference time, and may output the result of the analysis in the unit of a reference time. The controller 457 may selectively limit the operation of a specific app based on the monitoring result of the specific app that is output from the analysis unit. For example, if it is determined that the specific app unnecessarily uses the CPU 451 after being switched to the background, the controller 457 may limit the usage of the CPU 451 by the corresponding app.

According to an embodiment, a method for a processor to limit the usage of the CPU 451 by a specific app may be as follows. For example, the processor may allocate resources, such as the CPU usage time, system memory, and network bandwidth, to work groups (processes) that are executed in the system through cgroup of LINUX. For example, a method for performing scheduling limitation of the CPU usage may use two following subsystems.

1. CPUCTL Subsystem

The CPUCTL subsystem may schedule the CPU access with respect to the cgroup. The access to the CPU resources may be managed according to parameters, and respective CPUs in a cgroup pseudofile system may be handled as separate pseudofiles.

2. CPUSET Subsystem

The CPUSET subsystem may allocate the individual CPU and memory node to the cgroup. The CPUSET subsystem may designate a next parameter to a separate pseudofile in the cgroup pseudofile system. The CPUSET subsystem may generate the cgroup, and designate a CPU number to schedule the corresponding group. The designated group can be scheduled only by the designated CPU.

Hereinafter, the operation of an electronic device according to various embodiments of the present disclosure will be described in more detail.

According to various embodiments of the present disclosure, a method for operating an electronic device may include executing an app in response to a first user input; switching the app to a background in response to a second user input; confirming whether the app that has been switched to the background satisfies at least one condition; automatically limiting an operation of the app if the app that has been switched to the background satisfies the at least one condition; and displaying a report of the result of the automatic limitation of the app operation.

According to an embodiment, the method may further include confirming whether the app is included in a white list or a black list; not limiting the operation of the app if the app is included in the white list; and automatically limiting the operation of the app without separately monitoring the app after switching the app to the background if the app is included in the black list.

According to an embodiment, the method may further include receiving the white list from an external device; updating the white list based on a third user input; and transmitting the updated white list to the external device.

According to an embodiment, the automatically limiting the operation of the app may include limiting a CPU usage amount of the app.

According to an embodiment, the confirming whether the app that has been switched to the background satisfies the at least one condition may include confirming whether the app uses a CPU with not less than a first threshold value for a specific time on the background.

According to an embodiment, the method may further include monitoring a network usage amount of the app for a specific time; and not limiting the operation of the app if the network usage amount of the app is equal to or larger than a second threshold value.

According to an embodiment, the method may further include confirming importance of the app; and not limiting the operation of the app if the importance of the app is set high.

According to an embodiment, the method may further include monitoring a CPU usage amount of the app for a specific time; and limiting the operation of the app if a change degree of the CPU usage amount of the app is smaller than a third threshold value.

According to an embodiment, the method may further include confirming whether the electronic device is connected to an external power supply; and not limiting the operation of the app if the electronic device is connected to the external power supply.

According to an embodiment, the method may further include confirming whether a front surface of the electronic device is put to face a bottom; and further heightening a limitation degree of the operation of the app if the front surface of the electronic device is put to face the bottom.

According to an embodiment, the limiting the operation of the app may further include allocating the app so that the app operates in a low-power CPU that is driven by relatively low power among a plurality of CPUs, automatically stopping the operation of the app, or automatically uninstalling the app.

FIG. 5 illustrates a method for reducing power consumption of an electronic device according to various embodiments of the present disclosure. Hereinafter, referring to FIG. 5, a method for reducing power consumption of an electronic device according to various embodiments of the present disclosure will be described.

At operation 501, a processor (e.g., processor 450) may execute an app in response to a user input. For example, the processor 450 may receive a first user input through an input device (e.g., input device 440), and may execute a specific app based on the first user input. The first user input may be an event to execute at least one of a plurality of apps that are installed in an electronic device (e.g., electronic device 400).

At operation 503, the processor 450 may switch the app that has been executed on the foreground to the background on the basis of a user input. For example, the processor 450 may receive a second user input through the input device, and may switch the app that has been executed on the foreground to the background on the basis of the second user input. The second user input may be an event to switch the app that has currently been executed in the foreground state to the background. The second user input may be, for example, an input event for a user to select a home key that is provided on the electronic device 400. For example, the processor 450 may switch the app that has been executed on the foreground to the background in response to the input event for the user to select the home key. According to another embodiment, the second user input may be an input event for the user to select a back key. For example, the processor 450 may switch the app that has been executed on the foreground to the background in response to the input for the user to select the back key. As described above, the app that has been switched to the background may be maintained in a standby state in a memory (e.g., memory 420). The standby state may be, for example, a cached state.

In an embodiment, the processor 450 of the electronic device 400 may determine whether the app that is being executed on the background abnormally drives the electronic device 400. For example, if it is determined that the app that is being executed on the background abnormally drives the electronic device 400, the processor 450 may automatically limit the operation of the corresponding app. In the present disclosure, the expression "specific app abnormally drives the electronic device 400" may include a state where the specific app abnormally drives (uses) the CPU (e.g., CPU 451). Accordingly, the processor 450 may monitor the usage amount of the CPU 451 of the app that is being executed on the background, and may automatically limit the operation of the corresponding app if the usage amount of the CPU 451 of the corresponding app is abnormally large. In the present disclosure, the expression "limits the operation of a specific app" may include that the processor 450 limits the usage rate (or amount) of the CPU 451 with respect to the specific app, compulsorily interrupts the execution of the specific app, or compulsorily uninstalls the specific app.

It may not be desired by the user that the processor 450 limits the operation of the specific app, or may make the electronic device 400 in an abnormal state. Accordingly, the processor 450 may determine whether the app that is being executed on the background abnormally drives the electronic device 400, and may determine whether the specific app is included in a white list before limiting the operation of the corresponding app in accordance with the result of the determination. For example, at operation 505, the processor 450 may confirm whether the app that is being executed on the background corresponds to a white list or a black list. If the specific app corresponds to the white list, the processor 450 may not limit the operation of the corresponding app, whereas if the specific app corresponds to the black list, the processor 450 may limit the operation of the corresponding app. According to an embodiment, if the specific app corresponds to the white list or the black list, the processor 450 may perform operation 515 or bypass the subsequent operation. Further, if the specific app is not included in the white list, the processor 450 may limit the operation of the specific app without separate monitoring operation with respect to the specific app. For example, if the app that has been switched to the background is not included in the white list, the processor 450 may limit the usage amount of the CPU 451 of the corresponding app through performing of operation 511.

According to an embodiment, the white list and the black list may be received from an external device, for example, a server, and may be stored in the memory 420. The processor 450 may determine whether the specific app is included in the white list or the black list with reference to the memory 420. According to an embodiment, the processor 450 may connect to the server in a specific period to update the white list and the black list that are stored in the memory 420. According to another embodiment, the processor 450 may connect to the server in response to a user input to update the white list and the black list that are stored in the memory 420. According to still another embodiment, the processor (e.g., processor 450) may update the white list or the black list when app installation is performed.

The white list and the black list will be described in more detail as follows. The white list may be an object for which the processor does not limit the operation of a specific app even if the corresponding app performs an abnormal operation on the background, for example, even if the usage amount of the CPU 451 is large. The black list may be an object for which the processor unconditionally limits the operation of the specific app if the corresponding app is switched to the background. For example, if the specific app that is included in the black list is switched to the background, the processor may limit the operation of the corresponding app (e.g., limit the usage amount of the CPU 451) without separately monitoring the operation of the corresponding app.

At operation 507, the processor 450 may select a candidate list from apps that are being executed on the background. For example, the processor 450 may primarily select a list for limiting the operation of the apps that are being executed on the background. For example, the processor 450 may determine whether the app that is being executed on the background satisfies at least one condition. If the corresponding app satisfies the at least one condition, the processor 450 may select the corresponding app as the candidate list. The operation of the at least one app that is selected as the candidate list may be limited depending on whether the app satisfies the at least one condition in the subsequent operation. At operation 507, a method for the processor 450 to select the candidate list from the apps that are being executed on the background will be described in detail later.

At operation 509, the processor 450 may determine whether the app that is selected as the candidate list corresponds to an exceptional case. For example, the processor 450 may determine a case where the operation of the apps that are selected as the candidate list is exceptionally unlimited. According to an embodiment, the operation of the app that is selected as an exceptional case may not be limited even if the corresponding app is selected as the candidate list. If the app that is selected as the candidate list corresponds to the exceptional case, the processor 450 may perform operation 515. Further, if the app that is selected as the candidate list does not correspond to the exceptional case, the processor 450 may perform operation 511.

At operation 511, if the specific app does not correspond to the exceptional case, the processor 450 may automatically limit the usage amount of the CPU 451 of the corresponding app. It is an example of limiting the operation of the app that the processor 450 limits the usage amount of the CPU 451 of the specific app. For example, in addition to limitation of the usage amount of the CPU 451 of the specific app, the processor 450 may compulsorily interrupt the execution of the specific app or uninstall the specific app. According to another embodiment, the operation for the processor 450 to limit the operation of the specific app may include an operation to set the specific app to use a low-power CPU 451 when the corresponding app is switched to the background. For example, the CPU 451 according to the present disclosure may be composed of a multi-core, and may be classified into a low-power CPU 451 that is driven with relatively low performance and low power and a high-performance CPU 451 that is driven with relatively high performance and high power. According to an embodiment, if the specific app abnormally operates the CPU 451 on the background, the processor may allocate the low-power CPU 451 to the corresponding app. According to an embodiment, since the processor 450 automatically limits the operation of the specific app that abnormally operates on the background (e.g., limits the usage amount of the CPU 451 of the specific app), power consumption can be reduced, and battery usage amount can be increased.

The processor 450 may display the result of limiting the operation of the specific app. For example, at operation 513, the processor 450 may display the result of automatically limiting the usage amount of the CPU 451 of the specific app. For example, the processor 450 may output a report screen for notifying of a usage amount change (reduced amount) of the CPU 451 of the specific app, a power consumption reduction amount, and a battery usage time increase, as the result of automatically limiting the usage amount of the CPU 451 of the specific app. Through confirming of the report screen, the user can confirm the usage amount change (reduced amount) of the CPU 451, the power consumption reduction amount, and the battery usage time increase as the electronic device 400 automatically limits the abnormal operation of the app that is executed on the background.

At operation 515, the processor 450 may determine whether the electronic device 400 abnormally operates after limiting the operation of the specific app, for example, after automatically limiting the usage amount of the CPU 451 of the specific app, and may update the white list or the black list according to the result of the determination. The processor 450 may transmit the updated white list or black list to the server. For example, if the electronic device 400 abnormally operates after the operation of the specific app is limited, the processor 450 may add the specific app to the white list to prevent the operation of the specific app from being limited. Further, the processor 450 may add the specific app to the white list in response to the user input, and may transmit the updated white list to the server. According to an embodiment, the server may receive updated white lists from a plurality of electronic devices 400, and may update the pre-stored white list through analysis of the received white lists. The server may distribute the updated white list to the plurality of electronic devices 400 in a specific period, or may transmit the updated white list to the specific electronic device 400 in response to a request that is received from the corresponding electronic device 400.

According to various embodiments, the above-described operations 513 and 515 may be selectively performed. For example, in relation to the operation 513, the processor 450 may provide a first user interface for enabling the user to select whether to display the result of limiting the operation of the specific app. The processor 450 may automatically display or may not display the result of automatically limiting the operation of the specific app in response to the user input through the first user interface. Further, in relation to the operation 515, the processor 450 may provide a second user interface for enabling the user to select whether to transmit the update operation of the white list and the black list and the result of the update to the server. The processor 450 may perform or may not perform the operation of transmitting the update operation of the white list and the black list and the result of the update to the server in response to the user input through the second user interface.

Figure 6:
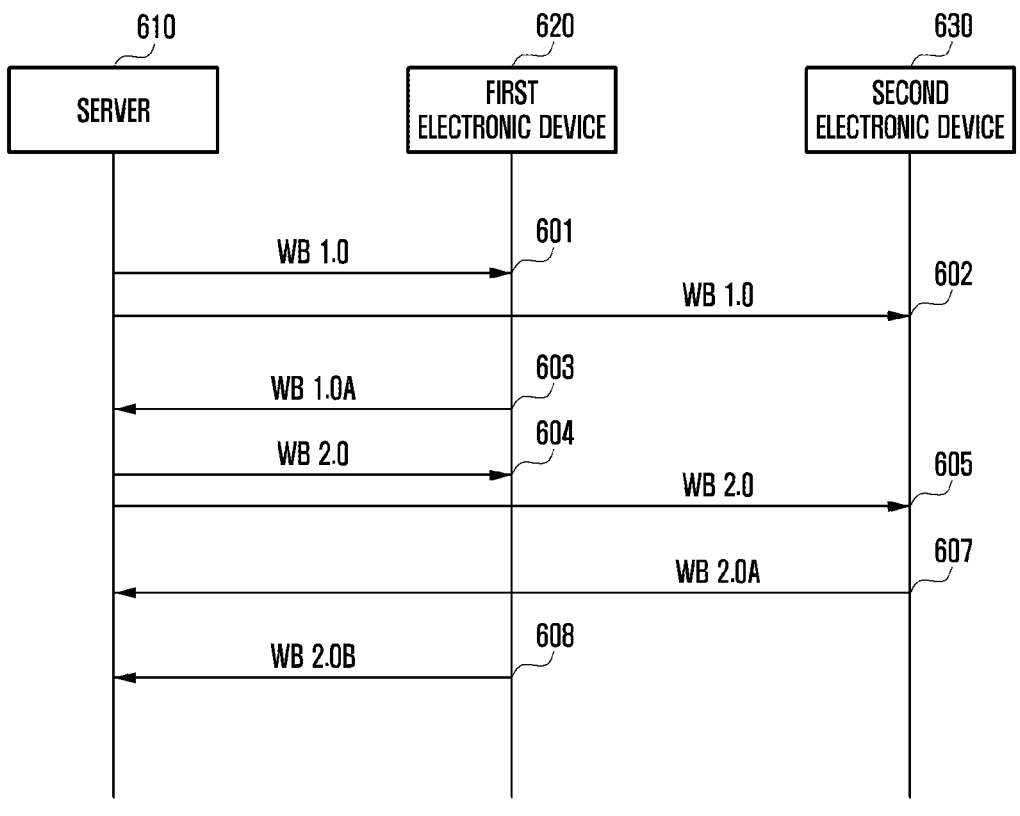
FIG. 6 illustrates the configuration of a network environment in which an electronic device is included according to various embodiments of the present disclosure.

FIG. 6 illustrates the configuration of a network environment in which an electronic device is included according to various embodiments of the present disclosure.

Referring to FIG. 6, in a network environment according to various embodiments of the present disclosure, first and second electronic devices 620 and 630 and a server 610 may be included. In the explanatory example of FIG. 6, the user's electronic device is the first electronic device 620.

At operation 601, the server 610 may transmit a pre-stored first white list WB1.0 to the first electronic device 620. Further, at operation 602, the server 610 may transmit the pre-stored first white list WB1.0 to the first electronic device 620 and a plurality of electronic devices connected to the server 610, for example, the second electronic device 630. According to an embodiment, the server may transmit the latest white list to the connected electronic device 400 or registered electronic device 400 in a specific period. According to another embodiment, the server 610 may transmit the latest white list to the specific electronic device in response to a message for requesting transmission of the latest white list from the specific electronic device 400.

At operation 603, the first electronic device 620 may selectively limit the operation of the apps that are executed on the background based on the first white list WB1.0 that is received from the server 610. The first electronic device 620 may generate a second white list WB1.0A through updating of the first white list WB1.0 in accordance with the result of performing at least one operation disclosed in FIG. 5. The first electronic device 620 may transmit the second white list WB1.0A to the server 610. Although not illustrated, in the same manner as the first electronic device 620, other electronic devices connected to the server 610, for example, the second electronic device 630, may update the first white list WB1.0, and may transmit the updated white list to the server 610.

At operation 604, the server 610 may generate a third while list WB2.0 through analysis and processing of the second white list WB1.0A that is received from the first electronic device 620 and a plurality of electronic devices (not illustrated). According to an embodiment, the third white list WB2.0 may reflect therein the second white lists WB1.0A that are received from the first electronic device 620 and the plurality of electronic devices (not illustrated). Like the operation 604, the server 610 may transmit the third white list WB2.0 even to the second electronic device 630 and a plurality of electronic devices (not illustrated), for example, the first electronic device 620. The server 610 may transmit the third white list WB2.0 to the first electronic device 620.

At operation 607, the second electronic device 630 may selectively limit the operation of the apps that are executed on the background based on the third white list WB2.0 that is received from the server 610. The second electronic device 630 may generate a fourth white list WB2.0A through updating of the third white list WB2.0 in accordance with the result of performing at least one operation disclosed in FIG. 5. The second electronic device 630 may transmit the fourth white list WB2.0A to the server 610. According to an embodiment, at operation 608, in the same manner as the second electronic device 630, other electronic devices connected to the server 610, for example, the first electronic device 620, may update the third white list WB2.0, and may transmit the updated white list to the server 610.

According to various embodiments, the white list WB2.0B that is updated by the first electronic device 620 on the basis of the third white list WB2.0 may be different from the white list WB2.0A that is updated by the second electronic device 630 on the basis of the third white list WB2.0. The server 610 may receive the updated white lists, for example, WB2.0A and WB2.0B, from the plurality of electronic devices, and may generate the latest white list through analysis and processing of the received white lists. Like operations 601, 602, 604, and 605, the server may transmit the generated latest white list to the plurality of electronic devices.

Figure 7:
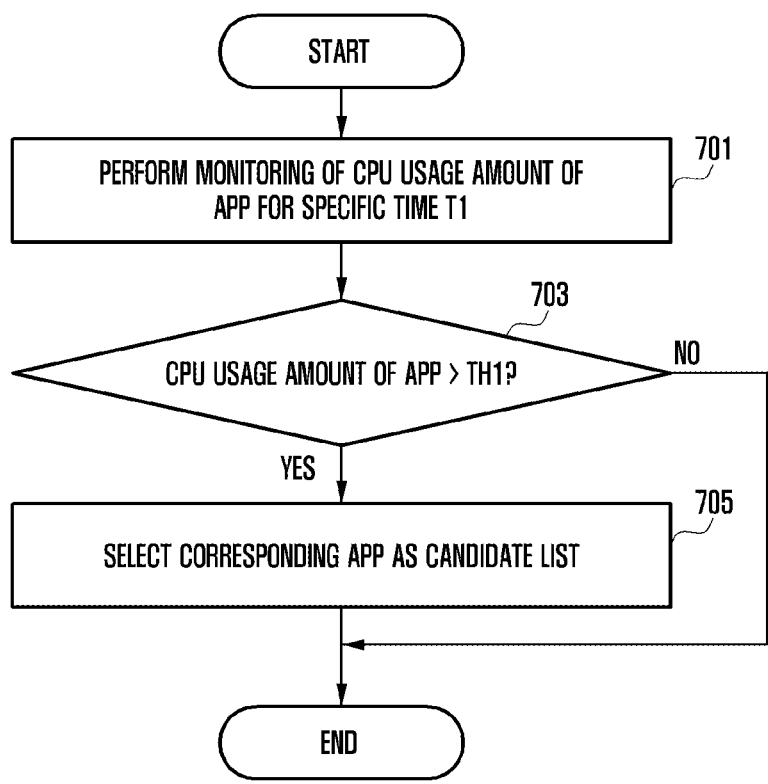
FIG. 7 illustrates a method for an electronic device to select a candidate list from apps that are executed on a background according to various embodiments of the present disclosure.
Figure 8A:
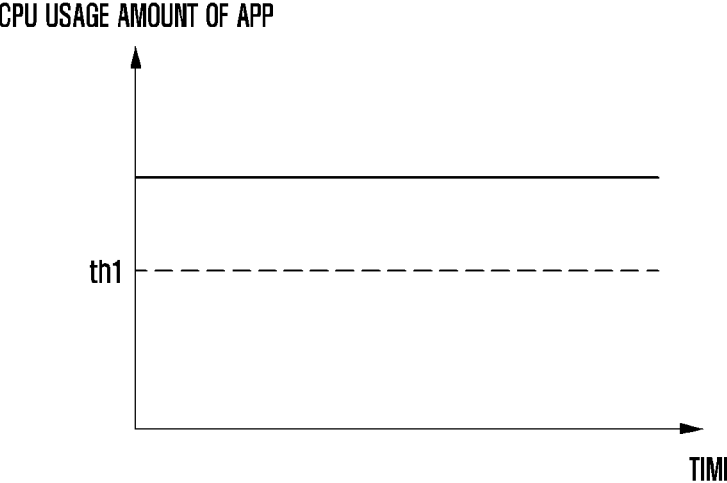
FIGS. 8A and 8B illustrate a method for an electronic device to limit a usage amount of a CPU according to various embodiments of the present disclosure.
Figure 8B:
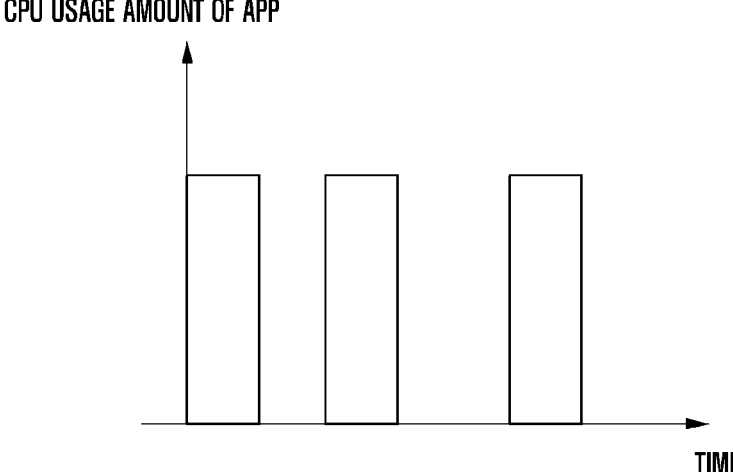

FIG. 7 illustrates a method for an electronic device to select a candidate list from apps that are executed on a background according to various embodiments of the present disclosure, and FIGS. 8A and 8B illustrate a method for an electronic device to limit a usage amount of a CPU according to various embodiments of the present disclosure. The flowchart illustrated in FIG. 7 may be an example of operation 507 as illustrated in FIG. 5.

At operation 701, the processor 450 may monitor the usage amount of the CPU 451 of the app for a specific time, for example, for a first reference time t1. For example, the processor 450 may monitor the usage amount of the CPU 451 of the app for the first reference time t1 from a time point when the specific app is switched to the background.

At operation 703, the processor 450 may determine whether the usage amount of the CPU 451 of the app that is switched to the background for the first reference time t1 is larger than a specific threshold value, for example, a first threshold value th1. If the usage amount of the CPU 451 of the app that is switched to the background for the first reference time t1 is equal to or larger than the first threshold value th1, the processor 450 may perform operation 705. If the usage amount of the CPU 451 of the app that is switched to the background for the first reference time t1 is smaller than the first threshold value th1, the processor 450 may bypass the subsequent operations.

At operation 705, the processor 450 may select the app for which the usage amount of the CPU 451 is excessive (exceeds the first threshold value th1) among the apps that are switched to the background as the candidate list. If the app that is selected as the candidate list is not an exceptional case through the subsequent determination operation of the processor 450, the usage amount of the CPU 451 may be limited.

For example, as illustrated in FIG. 8A, if the usage amount of the CPU 451 of the specific app for the first reference time t1 from the time when the specific app is switched to the background is continuously maintained to be equal to or larger than the first threshold value th1, the corresponding app may be selected as the candidate list. If the specific app is not the exceptional case through the subsequent determination operation of the processor 450, as illustrated in FIG. 8B, the usage amount of the CPU 451 may be limited. Accordingly, if the app that is switched to the background has an abnormally excessive usage amount of the CPU 451 (usage amount that exceeds the first threshold value th1), the electronic device according to an embodiment may limit the usage amount of the CPU 451 of the corresponding app, so that unnecessary usage of resources of the CPU 451 can be reduced, and the power consumption can be reduced as the result.

Figure 9A:
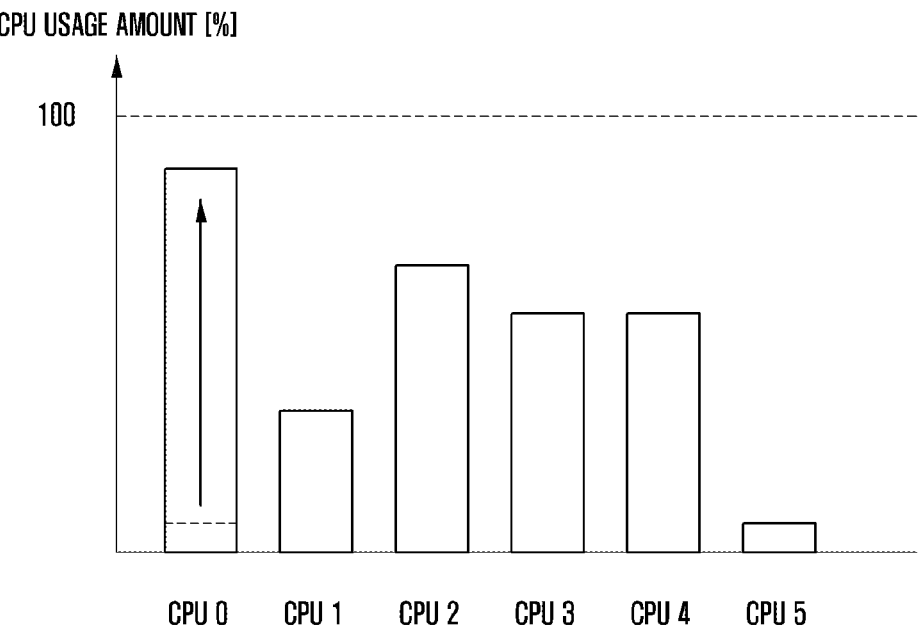
FIGS. 9A and 9B illustrate a method for an electronic device to limit an abnormal usage of CPU resources of an app in the case where the electronic device is provided with a multi-core CPU according to various embodiments of the present disclosure.
Figure 9B:
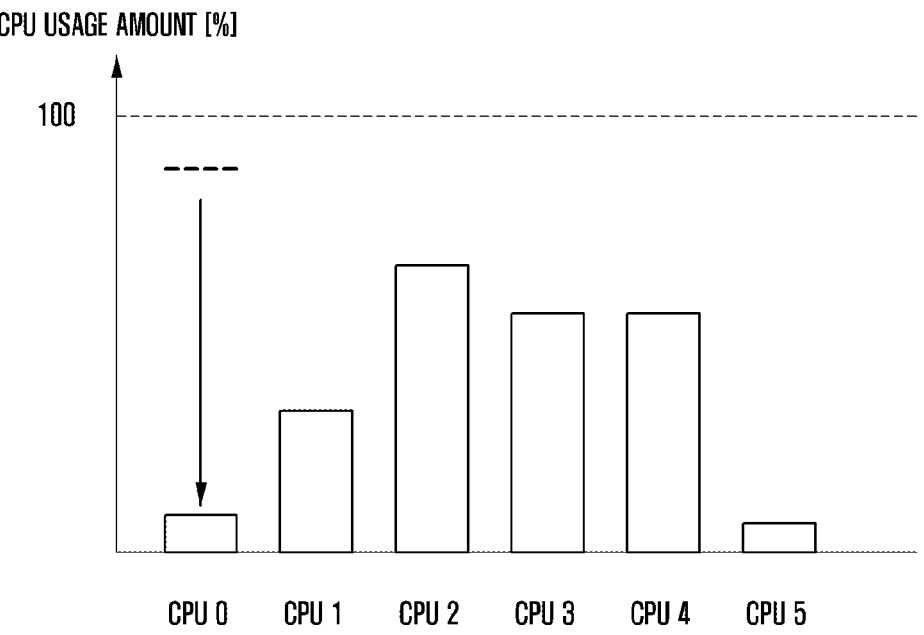

FIGS. 9A and 9B illustrate a method for an electronic device to limit an abnormal usage of CPU resources of an app in the case where the electronic device is provided with a multi-core CPU according to various embodiments of the present disclosure.

Referring to FIG. 9A, the electronic device 400 can perform multitasking in which a plurality of apps are simultaneously executed by the system, and may be provided with CPUs 451 having multiple cores, that is, by a multi-core processor. For example, the electronic device 400 may be provided with first to sixth CPUs CPU0 to CPU5 having six cores. The first to sixth CPUs CPU0 to CPU5 may be independently driven in accordance with the currently executed apps. For example, after being switched to the background, the specific app may be allocated with the use of the first CPU CPU0. However, as illustrated in FIG. 9A, due to an abnormal operation of the specific app, the usage amount of the first CPU CPU0 may be suddenly increased from the existing numerical value (e.g., indicated by a dotted line). In this case, since the second to sixth CPUs CPU1 to CPU5 exist in addition to the first CPU CPU0, the electronic device 400 has no error in the overall operation thereof. However, the first CPU CPU0 is unnecessarily operating, and this may cause unnecessary power consumption. For example, as illustrated in FIG. 9B, the electronic device 400 may limit the usage amount of the first CPU CPU0 so as to prevent the specific app from unnecessarily using the first CPU CPU0. As illustrated in FIG. 9B, since the electronic device 400 according to an embodiment limits the usage amount of resources of the CPUs CPU1 to CPU5 if the app that is switched to the background abnormally uses the resources of the CPUs CPU1 to CPU5, unnecessary power consumption can be reduced, and thus battery usage time can be increased as the result.

FIG. 10 illustrates a method for an electronic device to select a case from apps that are selected as a candidate list, according to another embodiment of the present disclosure. The flowchart of FIG. 10 may be an example of operation 509 as illustrated in FIG. 5.

At operation 1001, the processor 450 may monitor a network usage amount of an app for a specific time, for example, for a second reference time t2. For example, the processor 450 may monitor the network usage amount of the app for the second reference time t2 from a time point when the specific app is switched to the background.

At operation 1003, the processor 450 may determine whether the network usage amount of the app for the second reference time t2 is larger than a specific threshold value, for example, a second threshold value th2. If the network usage amount of the app for the second reference time t2 is equal to or larger than the second threshold value th2, the processor 450 may perform operation 1005. If the network usage amount of the app for the second reference time t2 is smaller than the second threshold value th2, the processor 450 may bypass the subsequent operations. For example, if the network usage amount of the app for the second reference time t2 is smaller than the second threshold value th2, the processor 450 may limit the operation of the corresponding app in the subsequent operations.

At operation 1005, the processor 450 may select the app for which the network usage amount is equal to or larger than the specific value (second threshold value th2) as an exceptional case. The app that is selected as the exceptional case does not have a limited usage amount of the CPU 451 in the subsequent operation of the processor 450. For example, a specific app, such as a game app, mostly receives installation data using a network on the background. According to an embodiment, if the network usage amount on the background is equal to or larger than a specific value, such as in the game app, the electronic device 400 does not limit the usage amount of the CPU 451 of the corresponding app to prevent malfunction of the game app.

FIG. 11 illustrates a method for an electronic device to select an exceptional case from apps that are selected as a candidate list, according to various embodiments of the present disclosure. The flowchart illustrated in FIG. 11 may be an example of operation 509 as illustrated in FIG. 5.

At operation 1101, the processor 450 may confirm importance of the app that is selected as the candidate list. The importance of the app may be set on the basis of a user input, or may be set by the system.

At operation 1103, the processor 450 may confirm whether the importance of the app that is selected as the candidate list is set high. The app of which the importance is set high may be an app of which the user does not desire to limit the usage of the CPU 451, or may be an app that is set for a smooth operation of the electronic device 400 in the system. If the importance of the corresponding app is high, the processor 450 may perform operation 1105. If the importance of the corresponding app is not high, the processor 450 may limit the operation of the corresponding app in the subsequent operations. For example, a specific app, such as a music reproduction app, mostly performs streaming through connection to the network on the background. The electronic device 400 according to an embodiment may not limit the usage amount of the CPU 451 with respect to the app that should be continuously and smoothly operated on the background, such as the music reproduction app or a recording app.

At operation 1105, the processor 450 may set the corresponding app as the exceptional case if the importance of the app that is selected as the candidate list is set high. The app that is selected as the exceptional case does not have a limited usage amount of the CPU 451 in the subsequent operation of the processor 450.

FIG. 12 illustrates a process for an electronic device to exclude a specific app from an exceptional case according to various embodiments of the present disclosure, and FIG. 13 is a graph explaining a process for an electronic device to exclude a specific app from an exceptional case according to various embodiments of the present disclosure. An example illustrated in FIGS. 12 and 13 may be an example of operation 509 as illustrated in FIG. 5.

At operation 1201, the processor 450 may monitor the usage amount of the CPU 451 of the app for a specific time, for example, for a third reference time t3. For example, the processor 450 may monitor the usage amount of the CPU 451 of the app for the third reference time t3 from a time point when the specific app is switched to the background.

At operation 1203, the processor 450 may determine whether the change degree of the usage amount of the CPU 451 of the app for the third reference time t3 is smaller than a specific threshold value, for example, a third threshold value th3. If the change degree of the usage amount of the CPU 451 of the app for the third reference time t3 is smaller than the third threshold value th3, the processor 450 may determine that the operation of the corresponding app is abnormal, and may proceed to operation 1205. If the change degree of the usage amount of the CPU 451 of the app for the third reference time t3 is equal to or larger than the third threshold value th3, the processor 450 may determine that the operation of the corresponding app is normal, and may bypass the subsequent operations.

At operation 1205, if the change degree of the usage amount of the CPU 451 of the app for the third reference time t3 is smaller than the third threshold value th3, the processor 450 may exclude the corresponding app from the exceptional case. For example, as illustrated in FIG. 13, if the usage amount of the CPU 451 is not constant and the change degree thereof is larger than the third threshold value th3 after the specific app is switched to the background, the processor 450 may consider the corresponding app in a normal state, whereas if the usage amount of the CPU 451 is constant unlike that as illustrated in FIG. 13, the processor 450 may consider the corresponding app in an abnormal state. If it is determined that the specific app unnecessarily uses the CPU 451 in a state where the usage amount of the CPU 451 is constant after the corresponding app is switched to the background, the processor 450 may limit the operation of the corresponding app in the subsequent operations through excluding of the corresponding app from the exceptional case.

At operation 1203, a method for the processor 450 to calculate the change degree of the usage amount of the CPU 451 of the app will be described with reference to Equation 1 below.

Ux: Used resource amount (CPU and network) for unit time Td $$Udx = |Ud(n) - Ud(n-1)| \qquad \text{Equation 1}$$

Absolute value of resource usage change amount against previous time unit $$Uds = \Sigma Udx$$

Total sum of Udx

If Udx<th3, abnormal state is determined.

Referring to Equation 1, the processor 450 may divide time for using resources of the CPU 451 (or network resources) in a state where the specific app is on the background into specific unit time Td. The processor 450 may measure the usage amount change of the resources of the CPU 451 (or network resources) for each specific unit time period Td, and may calculate the total sum Udx of the measured amount change. If the total sum Udx of the measured amount change is smaller than the third threshold value th3, the processor 450 may determine that the corresponding app is in an abnormal state, and may exclude the corresponding app from the exceptional case.

FIG. 14 illustrates an exceptional case in which an electronic device does not limit an operation of an app according to various embodiments of the present disclosure. An example illustrated in FIG. 14 may be an example of operation 509 as illustrated in FIG. 5.

At operation 1401, the processor 450 may confirm whether the electronic device 400 is currently connected to an external power supply (e.g., charge adaptor or wireless power transmission device). For example, if the electronic device 400 is connected to the external power supply to charge a battery, the processor 450 may determine the exceptional case since necessity of a power consumption algorithm or method according to various embodiments of the present disclosure becomes relatively low.

At operation 1403, if the electronic device 400 is currently connected to the power supply to charge the battery, the processor 450 may release usage amount limitation of the CPU 451 of the app that is switched to the background. If the power that is connected to the electronic device 400 is released, the processor 450 may perform again the above-described operation for limiting the usage amount of the CPU 451 of the app that operates on the background.

FIG. 15 illustrates an exceptional case in which an electronic device 400 increases an amount of limitation of an operation of an app according to various embodiments of the present disclosure, and FIG. 16 is an exemplary diagram explaining an exceptional case in which an electronic device 400 increases an amount of limitation of an operation of an app according to various embodiments of the present disclosure. An example illustrated in FIGS. 15 and 16 may be an example of operation 509 as illustrated in FIG. 5.

At operation 1501, the processor 450 may determine whether the front surface of the electronic device 400 is currently put to face a bottom. For example, if the electronic device 400 is put so that the front surface thereof faces the bottom, the processor 450 may consider that the user does not use the electronic device 400, and may heighten the degree of usage amount limitation of the CPU 451 of the app that is switched to the background.

At operation 1503, if the front surface of the electronic device 1600 is currently put to face the bottom as illustrated in FIG. 16, the processor 450 may heighten the degree of usage amount limitation of the CPU 451 of the app that is switched to the background. For example, if the front surface of the electronic device 1600 is currently put to face the bottom, the processor 450 may consider that the user does not use the electronic device 1600, and may further increase the use limitation amount of the CPU 451 of the app that is switched to the background. In order to determine whether the front surface of the electronic device 1600 is put to face the bottom, the processor 450 may use at least one sensor (e.g., proximity sensor, illumination sensor, or infrared sensor) (not illustrated). According to an embodiment, if the screen of the electronic device 1600 is put to face the user, the processor 450 may limit the usage amount of the CPU 451 of the app that is switched to the background to a first level, whereas if the screen of the electronic device 1600 is put to face the bottom surface that is opposite to the front surface of the electronic device, the processor 450 may limit the usage amount of the CPU 451 of the app that is switched to the background to a second level that is higher than the first level. If the screen of the electronic device 1600 that has been put to face the bottom surface is put again to face the front surface of the electronic device, the processor 450 may reduce the usage amount limitation of the CPU 451 of the app that is switched to the background from the second level to the first level.

FIG. 17 illustrates a screen showing the result of app monitoring that is provided from an electronic device according to an embodiment of the present disclosure.

Referring to the illustrative example of FIG. 17, if an abnormal battery consumption problem of the app occurs, the electronic device 400 according to various embodiments of the present disclosure may report the occurring situation, and may provide a user selection button to solve the occurring situation and problem. For example, as illustrated in FIG. 17, the electronic device 400 may provide icons or titles with respect to first and second apps 1701 and 1703 that abnormally operate in relation to the usage of the PUC 451, and may provide a report of the result of diagnosing that the first and second apps 1701 and 1703 abnormally use the CPU 451. Further, the electronic device 400 may provide, on the screen, a first button 1710 for making the user select disregard and a second button 1720 for making the user select problem solving with respect to a case where the first and second apps 1701 and 1703 abnormally use the CPU 451. Further, the electronic device 400 may provide an icon or a title with respect to a third app 1705 that abnormally transmits and receives a beacon in relation to the usage of a short-range communication, for example, Bluetooth, and may provide, on the screen, the report of the result of diagnosing that the third app 1705 abnormally uses the beacon. Further, the electronic device 400 may provide, on the screen, a third button 1730 for making the user select disregard and a fourth button 1740 for making the user select problem solving with respect to a case where the third app 1705 abnormally transmits and receives a beacon. Further, the electronic device 400 may provide an icon or a title with respect to a fourth app 1707 that abnormally transmits and receives data in relation to the usage of location information, for example, GPS information, and may provide, on the screen, the report of the result of diagnosing that the fourth app 1707 abnormally uses the location information. Further, the electronic device 400 may provide, on the screen, a fifth button 1750 for making the user select disregard and a sixth button 1760 for making the user select problem solving with respect to a case where the fourth app 1707 abnormally uses the location information. Further, the electronic device 400 may provide, on the screen, a seventh button 1770 for making the user select disregard with respect to problems of all apps that are executed on the background and an eighth button 1780 for making the user select problem solving with respect to problems of all apps that are executed on the background.

According to various embodiments, the processor may update pre-stored white list or black list in response to an input (or event) for making the user select at least one of the first to eighth buttons 1710 to 1780 that are provided on the screen. For example, if the user selects at least one button for disregarding the problem that occurs in the app that is switched to the background, the processor may add at least one app that is related to the selected button to the white list.

Further, if the user selects at least one button for indicating problem solving with respect to the problem that occurs in the app that is switched to the background, the processor may add at least one app that is related to the selected button to the black list.

FIG. 18 illustrates a screen showing user selection for solving a battery overconsumption problem of an app on an electronic device 400 according to various embodiments. FIG. 19 illustrates a screen showing user selection for solving a battery overconsumption problem of an app on an electronic device 400 according to various embodiments, and FIG. 20 illustrates a screen showing user selection for solving a battery overconsumption problem of an app on an electronic device 400 according to various embodiments.

Referring to FIGS. 18 to 20, if a user selects the button (e.g., the second button 1720, the fourth button 1740, or the sixth button 1760 in FIG. 17) for solving the problem on a screen that provides a report of an abnormal operation of the app that is switched to the background, for example, a report of battery overconsumption problem, the electronic device according to various embodiments may provide an additional option with respect to the selected app.

For example, if a specific app abnormally operates, the electronic device 400 may provide a seventh button 1810, 1910, or 2010 for making the user select deletion of the corresponding app. If the user selects the seventh button 1810, 1910, or 2010, the electronic device 400 may delete (uninstall) the corresponding app. Further, if a specific app abnormally operates, the electronic device 400 may provide an eighth button 1820, 1920, or 2020 for making the user compulsorily interrupt the operation of the corresponding app. If the user selects the eighth button 1820, 1920, or 2020, the electronic device 400 may compulsorily interrupt the operation of the corresponding app.

According to an embodiment, if a specific app abnormally operates, as illustrated in FIG. 18, the electronic device 400 may provide a first selection button 1830 for automatically selecting whether to limit the use of the CPU 451 of the corresponding app. If a specific app abnormally operates in a state where the user switches the first selection button 1830 to an on state, the usage of the CPU 451 of the corresponding app may be automatically limited. According to an embodiment, the electronic device 400 may update the white list in response to an event in which the user switches the first selection button 1830 to an on state. For example, the processor 450 of the electronic device 400 may exclude the corresponding app from the white list, or may add the corresponding app to the black list in response to the event in which the user switches the first selection button 1830 to an on state. Accordingly, the processor 450 automatically limits the usage of the CPU 451 of the corresponding app if the corresponding app performs an abnormal operation.

According to another embodiment, if a specific app abnormally operates, as illustrated in FIG. 19, the electronic device 400 may provide a second selection button 1930 for automatically selecting whether to automatically end the operation of the corresponding app. If a specific app abnormally operates in a state where the user switches the second selection button 1930 to an on state, the electronic device 400 may automatically end the operation of the corresponding app.

According to still another embodiment, if a specific app abnormally operates, as illustrated in FIG. 20, the electronic device 400 may provide a third selection button 2030 for automatically uninstalling the corresponding app. If a specific app abnormally operates in a state where the user switches the third selection button 2030 to an on state, the electronic device 400 may automatically uninstall the corresponding app.

FIGS. 21A and 21B illustrates a screen for selecting whether an electronic device 400 automatically limits an abnormal operation of an app according to various embodiments of the present disclosure.

Referring to FIGS. 21A and 21B, the electronic device 400 may make the user reselect whether to automatically solve an abnormal operation of the app, for example, an unnecessary overuse problem of the CPU 451 of the app on the background. For example, as described above, if the CPU 451 of the app is abnormally used on the background, the electronic device 400 may automatically limit the usage amount of the CPU 451 of the corresponding app. According to an embodiment, the electronic device 400 may determine whether to automatically perform the operation to limit the abnormal usage amount of the CPU 451 based on the user input. For this, the electronic device 400 according to an embodiment may provide icons and titles 2111, 2113, 2115, and 2117 that indicate apps that operate on the background and apps that abnormally operate on the background in the form of a list. The list may be aligned on the basis of the usage amount of the CPU 451 on the background or on the basis of the degree of abnormality determination. On one side (e.g., lower end) of each of the icons and titles 2111, 2113, 2115, and 2117 of the apps included in the list, numerical values and graphs 2120 and 2122 that indicate the usage amount of the CPU 451 of the corresponding app may be provided. According to an embodiment, the electronic device 400 may provide a fourth selection button 2110 for automatically selecting whether to limit the usage amount of the CPU 451 of the corresponding app on one side (e.g., upper side (upper end)) of the list in which the apps that operate on the background and the apps that abnormally operate on the background are displayed if the CPU 451 of the app is abnormally used on the background.

As illustrated in FIG. 21B, if the user switches the fourth selection button 2110 to an on state, the electronic device 400 may automatically limit the usage of the CPU 451 of the specific app that abnormally operates. If the user switches the fourth selection button 2110 to an off state, the electronic device 400 may not automatically limit the usage of the CPU 451 of the specific app that abnormally operates.

According to an embodiment, the electronic device 400 may automatically provide a report of the result of limiting the usage of the CPU 451 of the corresponding app. For example, as illustrated in FIG. 21B, numerical values and graphs 2120 that are arranged on one side of each app to indicate the usage amount of the CPU 451 on the list screen may be displayed so that the result of limiting the usage of the CPU 451 of the corresponding app through the electronic device 400 can be known. For example, the graphs 2120 that indicate the usage amount of the CPU 451 of each app may include a first graph 2120*a* that automatically indicates a state before limiting the usage of the CPU 451 and a second graph 2120*b* that automatically indicates the result of limiting the usage of the CPU 451. The numerical value of the second graph 2120*b* is obtained after the electronic device 400 automatically limits the usage of the CPU 451 in the case where the corresponding app abnormally operates, and thus it may be smaller than the numerical value of the first graph 2120*a*.

According to the various embodiments of the present disclosure as described above, since the operation of the app that abnormally uses the CPU 451 on the background is limited, unnecessary usage of the CPU 451 and power consumption can be reduced, and the battery usage time can be increased.

A programming module according to embodiments of the present disclosure may include one or more of the aforementioned components or may further include other additional components, or some of the aforementioned components may be omitted. Operations executed by a module, a programming module, or other component elements according to various embodiments of the present disclosure may be executed sequentially, in parallel, repeatedly, or in a heuristic manner. Further, some operations may be executed according to another order or may be omitted, or other operations may be added.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An electronic device comprising:
a processor;
a display;
communication circuitry; and
memory storing instructions that, when executed by the processor, cause the electronic device to:
control the display to display a user interface including a button for controlling a use of the communication circuitry by applications running in a background;
in response to a first user input, change a state of the button to an on state;
in response to a second user input, execute an application in a foreground;
in response to a third user input, change a state of the application from running in the foreground to running in the background;
control, based on identifying that the application running in the background satisfies at least one condition while the button is in the on state, a setting related to the communication circuitry such that use of the communication circuitry by the application running in the background is limited;
control, based on identifying that the application running in the background is included in a first list stored in the memory, the setting related to the communication circuitry such that use of the communication circuitry by the application running in the background is not limited even if the application running in the background satisfies the at least one condition while the button is in the on state;
control, based on identifying that the application running in the background is included in a second list stored in the memory, the setting related to the communication circuitry such that use of the communication circuitry by the application running in the background is limited regardless of the at least one condition; and
determine not to monitor how much the communication circuitry is used by the application running in the background when the application running in the background is included in the second list stored in the memory,
wherein the memory further stores instructions that, when executed by the processor, cause the electronic device to:

monitor a usage amount of the communication circuitry by the application running in the background;
identify a time duration for which the usage amount of the communication circuitry by the application running in the background remains above a threshold value;
determine that the application running in the background does not satisfy the at least one condition when the time duration, for which the usage amount of the communication circuitry by the application running in the background remains above the threshold value, is less than a predetermined time duration; and
when the time duration, for which the usage amount of the communication circuitry by the application running in the background remains above the threshold value, exceeds the predetermined time duration, determine that the application running in the background satisfies the at least one condition.

2. The electronic device of claim 1, wherein the memory further stores instructions that, when executed by the processor, cause the electronic device to:
monitor how much the communication circuitry is used by the application running in the background; and
determine whether the application running in the background satisfies the at least one condition based on a result of the monitoring.

3. The electronic device of claim 1, wherein the memory further stores instructions that, when executed by the processor, cause the electronic device to control, based on identifying that the button is in an off state, the setting related to the communication circuitry such that the application running in the background uses the communication circuitry regardless of whether the application running in the background is not included in the first list stored and satisfies the at least one condition.

4. The electronic device of claim 1, wherein the memory further stores instructions that, when executed by the processor, cause the electronic device to: update the first list or the second list based on a user input.

5. The electronic device of claim 4, wherein the memory further stores instructions that, when executed by the processor, cause the electronic device to:
add the application running in the background to the first list based on a user input, or
delete the application running in the background from the first list based on a user input.

6. The electronic device of claim 4, wherein the memory further stores instructions that, when executed by the processor, cause the electronic device to:
add the application running in the background to the second list based on a user input, or
delete the application running in the background from the second list based on a user input.

7. The electronic device of claim 1, wherein the communication circuitry comprises at least one of a wireless communication circuitry, a short-range communication circuitry, or a GPS (global positioning system) circuitry.

8. The electronic device of claim 1,
wherein the first list is a white list stored in the memory, and
wherein the second list is a black list stored in the memory.

9. A method of an electronic device, the method comprising:

displaying a user interface including a button for controlling a use of communication circuitry by applications running in a background;

in response to a first user input, changing a state of the button to an on state;

in response to a second user input, executing an application in a foreground;

in response to a third user input, changing a state of the application from running in the foreground to running in the background;

controlling, based on identifying that the application running in the background satisfies at least one condition while the button is in the on state, a setting related to the communication circuitry such that use of the communication circuitry by the application running in the background is limited;

controlling, based on identifying that the application running in the background is included in a first list stored in a memory of the electronic device, the setting related to the communication circuitry such that use of the communication circuitry by the application running in the background is not limited even if the application running in the background satisfies the at least one condition while the button is in the on state;

controlling, based on identifying that the application running in the background is included in a second list stored in the memory, the setting related to the communication circuitry such that use of the communication circuitry by the application running in the background is limited regardless of the at least one condition; and determining not to monitor how much the communication circuitry is used by the application running in the background when the application running in the background is included in the second list stored in the memory, wherein the method further comprises:

monitoring a usage amount of the communication circuitry by the application running in the background;

identifying a time duration for which the usage amount of the communication circuitry by the application running in the background remains above a threshold value;

determining that the application running in the background does not satisfy the at least one condition when the time duration, for which the usage amount of the communication circuitry by the application running in the background remains above the threshold value, is less than a predetermined time duration; and when the time duration, for which the usage amount of the communication circuitry by the application running in the background remains above the threshold value, exceeds the predetermined time duration, determining that the application running in the background satisfies the at least one condition.

10. The method of claim 9, further comprising:

monitoring how much the communication circuitry is used by the application running in the background; and determining whether the application running in the background satisfies the at least one condition based on a result of the monitoring.

11. The method of claim 9, further comprising:

controlling, based on identifying that the button is in an off state, the setting related to the communication circuitry such that the application running in the background uses the communication circuitry regardless of whether the application running in the background is not included in the first list stored and satisfies the at least one condition.

\* \* \* \* \*